United States Patent
Koh et al.

(10) Patent No.: US 12,449,820 B2
(45) Date of Patent: Oct. 21, 2025

(54) THERMAL IMAGING WITH PERSPECTIVE CORRECTION

(71) Applicant: YOKOGAWA ELECTRIC CORPORATION, Tokyo (JP)

(72) Inventors: Jia Xuan Koh, Singapore (SG); Saurabh Bhandari, Singapore (SG); Gokula Krishnan Sivaprakasam, Singapore (SG); Palani Rajan Kaliyamoorthy, Singapore (SG)

(73) Assignee: YOKOGAWA ELECTRIC CORPORATION (JP)

( * ) Notice: Subject to any disclaimer, the term of this patent is extended or adjusted under 35 U.S.C. 154(b) by 153 days.

(21) Appl. No.: 18/510,278

(22) Filed: Nov. 15, 2023

(65) Prior Publication Data
US 2025/0155892 A1    May 15, 2025

(51) Int. Cl.
| | | |
|---|---|---|
| *G06V 10/14* | (2022.01) | |
| *G01J 5/00* | (2022.01) | |
| *G01J 5/02* | (2022.01) | |
| *G01J 5/10* | (2006.01) | |
| *G05D 1/243* | (2024.01) | |
| *G05D 1/689* | (2024.01) | |
| *G06V 10/25* | (2022.01) | |
| *G06V 10/774* | (2022.01) | |
| *G06V 10/82* | (2022.01) | |
| *G06V 20/52* | (2022.01) | |
| *G06V 20/56* | (2022.01) | |
| *G05D 105/80* | (2024.01) | |

(52) U.S. Cl.
CPC ............ *G05D 1/243* (2024.01); *G01J 5/0066* (2013.01); *G01J 5/0265* (2013.01); *G01J 5/10* (2013.01); *G05D 1/689* (2024.01); *G06V 10/14* (2022.01); *G06V 10/25* (2022.01); *G06V 10/774* (2022.01); *G06V 10/82* (2022.01); *G06V 20/52* (2022.01); *G06V 20/56* (2022.01); *G01J 2005/0077* (2013.01); *G05D 2105/89* (2024.01)

(58) Field of Classification Search
CPC .... G05D 1/243; G05D 1/689; G05D 2105/89; G06V 10/25; G06V 20/52; G06V 10/14; G06V 10/82; G06V 10/774; G06V 20/56; G01J 5/0066; G01J 5/0265; G01J 5/10; G01J 2005/0077
See application file for complete search history.

(56) References Cited

U.S. PATENT DOCUMENTS

2017/0270375 A1*  9/2017  Grauer ................... G06V 10/60

* cited by examiner

*Primary Examiner* — Mathew Franklin Gordon
(74) *Attorney, Agent, or Firm* — Sheridan Ross P.C.

(57) ABSTRACT

Imaging industrial assets to ensure their correct operation or identifying faults can be a time-consuming and error-prone task. By automating the imaging capture process and utilizing neural networks to identify the assets, assets may be quickly and accurately identified as well as their current operational state. Asset imaging may be accomplished via visual or infrared imaging or a combination thereof to identify an asset and to determine if the asset is operating within expected parameters or, if not, to initiate corrective action.

20 Claims, 23 Drawing Sheets

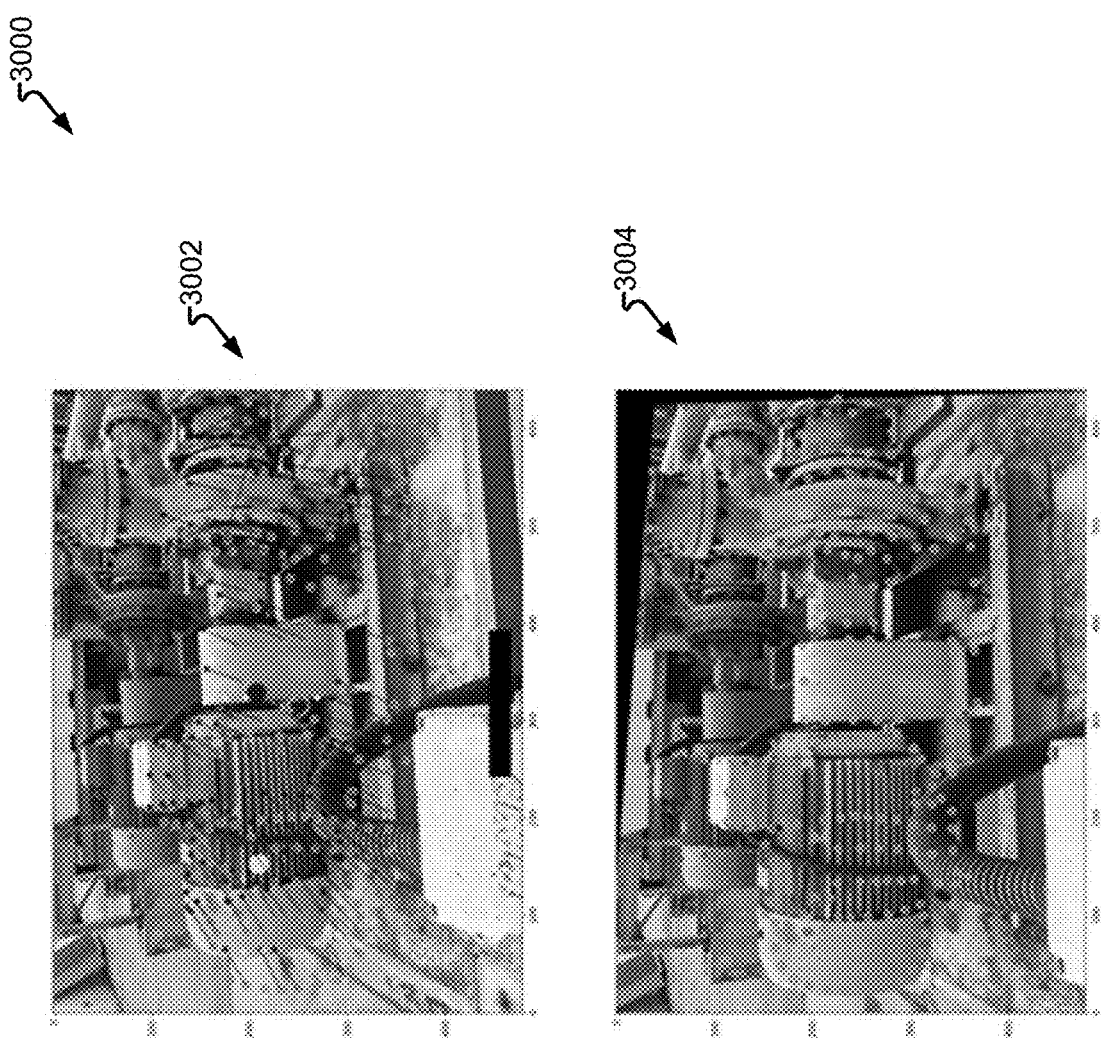

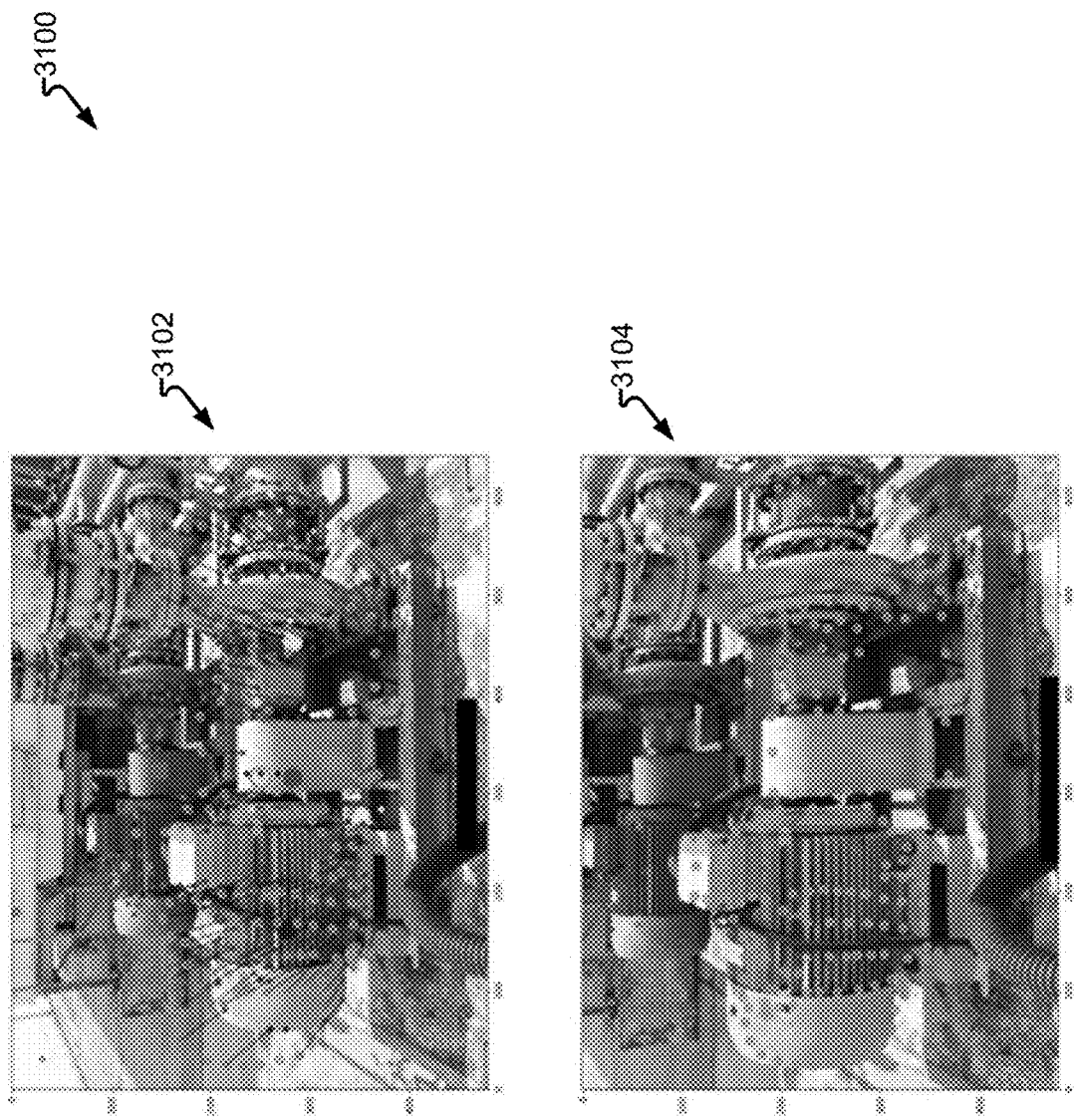

THERMAL IMAGING WITH PERSPECTIVE CORRECTION

FIELD OF THE DISCLOSURE

The invention relates generally to systems and methods for imaging of industrial assets and particularly to utilizing neural networks, machine learning models, classic computer vision, to analyze infrared and/or visual images to identify and evaluate industrial assets.

BACKGROUND

Imaging industrial assets (or, more simply, "assets") provides a means to identify the particular asset or type of asset, as well as certain characteristics of the asset. The characteristics may include identifying characteristics presented in the visible and non-visible spectrum of the asset itself as well as attributes of the asset (e.g., leak, operating/not operating, position of a component, attached equipment, etc.). Infrared imaging can be useful to identify the temperature of the asset or portions of the asset.

For many facilities (e.g., factory, chemical plant, petroleum distillation, etc.) a user is tasked to take images of the assets periodically, such as daily. Other assets may require more or less frequent imaging. For facilities that have a large number of assets, such as machines, pumps, etc., this may be a significant task.

When capturing an image of an asset, the user may conduct a cursory review, such as to view a display screen presenting a captured image. When the imaging is infrared, the user may determine that the image was correctly captured and whether or not an expected hotspot is shown in the image. The user may then note such results and/or associate the particular image with a particular asset.

Commonly, the images are downloaded from the camera to another computer for subsequent storage and analysis. For example, a user may draw a bounding box around an area of interest comprising a portion of an asset. One asset may have one or more bounding boxes. The user may then observe the images or particular bounding boxes for anomalies in each image.

While such techniques enable many facilities to operate as designed and to catch problems early, imaging of assets for analysis is a time-consuming and error-prone process. Additionally, changes due to environmental or other factors, including changes over time, are difficult for a human user to accurately consider when determining whether an asset is working as expected.

SUMMARY

Visual spectrum imaging of assets can be used to identify the assets and/or operational attributes of the assets. Imaging may identify the specific asset (e.g., the identifier, model and serial number, etc.) or a category or type of asset being imaged. Thermal imaging (i.e., infrared) of an asset can provide additional, alternative, or supplemental information compared to visual imaging. Thermal imaging can assist in identifying an asset, such as when heat from a motor-portion of an asset is identified in one location, such as may be consistent with a first asset or first type of asset, versus detecting heat from a motor located in a second location that is consistent with a second asset or second type of asset. Thermal imaging can also identify portions of an asset based on heat signature, such as a motor-portion of a pump, or a bearing of a shaft driven by the pump. Thermal imaging of an asset may be used to determine the current state of the asset, such as an operational, standby, transient, or steady state or state changes over time and whether the asset or a portion of the asset is operating normally or anomalously. The state of the asset may be determined by the thermal imaging of the asset, such as when actively operating and generating a thermal image indicating the operation thereof, such as heat generated by motors or other electrical equipment and/or heat generated by feed or output stock, or endothermic or exothermic reactions within the asset as feed stock is transformed into output stock; a standby state, such as detecting the operation of monitoring equipment, the temperature signatures of heaters/chillers portions used to prepare for transition to the operational state, etc.

Being able to image an asset quickly and accurately is often difficult due to the time available to capture an image, variations in the imaging device, and variations in the use of the imaging device. Furthermore, there are usually a huge amount of different types and numbers of assets in an industrial plant, it could be extremely difficult/not possible for a human to identify which area(s)/region(s) of an asset to take images and for monitoring (e.g. temperature monitoring) and/or other purposes. An asset may be imaged from one location, relative to the asset, and subsequently imaged from another location. For example, a subsequent image(s) may vary in terms of imaging location, height of the imaging device, zoom setting, angle, rotation, vibration, etc. Thermal imaging may show variations due to the operation of the asset (e.g., load on the asset, recent startup versus continuing operation, feedstock attribute, etc.) As a result, images taken over time will vary, complicating analysis of the images to identify anomalous behavior.

These and other needs are addressed by the various embodiments and configurations of the present invention. The present invention can provide a number of advantages depending on the particular configuration. These and other advantages will be apparent from the disclosure of the invention(s) contained herein.

In one embodiment, computer vision algorithms, deep learning neural networks and machine learning models are used to improve the accuracy of temperature calculation and account for differences in imaging (e.g. angle, rotation). A trained neural network is provided to enable an automated image processing to identify an asset and/or identify the operational attributes of the asset and subsequent operation of the asset, such as to continue the current operation, schedule maintenance, or perform an emergency operation (e.g., shut down).

Accurately imaging an asset in a real-world environment, such as a large factory, chemical plant, petroleum distillation facility, etc., is error prone. Certain assets may be portable and moved routinely, while other assets may be fixed but operate in a dynamic environment. The ambient environment may change, such as season to season, or the production environment may change, such as when a production line is processing one feedstock versus another, operating at different loads, etc.

Imaging challenges are further complicated by image capturing that is not consistent. Variations may occur due to height, angles, zoom settings, etc. Therefore, it is desired to establish a method or system, which could account for all those variations in imaging taking and identifying an asset and its associated areas (e.g. areas of interest) automatically for monitoring temperature, managing asset and/or other purposes. Transforming a raw image (e.g. a thermal image captured) into a processed image may be necessary to attenuate the imaging errors, for example, the thermal image could be transformed/processed through certain transformation after comparing with a reference/template image associated with the asset. Transformations may include affine transformations and homographic transformations.

Affine transformations are commonly used in image processing, computer vision applications, and computer graphics as transformed images maintain straight lines and parallelism. Affine transformations reserve parallel lines, ratios of distances, and ratios of areas. An affine transformation includes translation, rotation, scaling, and skewing.

With homographic transformations, a homography matrix (which can be referred to as projective transformation or perspective transformation) is a more general transformation that can handle affine transformations as well as perspective transformations. A perspective transformation introduces a vanishing point, and it does not necessarily preserve parallel lines, collinearity, or the ratios of areas.

Both affine transformation and homography matrix are represented by a 3×3 matrix. The main distinction is that the elements of the homography matrix can take any non-zero value, while certain elements in an affine transformation matrix have specific constraints, which means less degrees of freedom for affine transformation.

In certain other embodiments, other transformations may be utilized such as thin-plate spline (TPS), piecewise affine transformation (Warping), radial basis function (RBF), projective, similarity (i.e., scaling), Euclidean, and/or deformable image registration.

In some aspects, the techniques described herein relate to a device for monitoring temperature of an asset in an environment, the device including: a transport instrument that is instructed to patrol an environment, wherein the transport instrument moves within the environment in an autonomous or semi-autonomous manner; a thermal image capture device positioned on the transport instrument that supports autonomous capture of a thermal image of the environment; and a processor configured to process the thermal image so as to identify the asset from a database of assets and to determine at least one region of interests of the asset where temperature measurement is to be performed; wherein the transport instrument is configured to move in accordance with a result from the processing of the thermal image.

In some aspects, the techniques described herein relate to a device, wherein the transport instrument is configured to move autonomously such that image capture is performed at an angle suitable for successful processing of the thermal image.

In some aspects, the techniques described herein relate to a device, wherein the transport instrument is configured to move autonomously to adjust the distance between the asset and the thermal image capture device for successful processing of the thermal image.

In some aspects, the techniques described herein relate to a device, wherein the transport instrument is configured to move autonomously to adjust the position of the thermal image capture device for successful processing of the thermal image in accordance with machine learning.

In some aspects, the techniques described herein relate to a device, wherein the transport instrument is configured to move in accordance with the result from the processing of the thermal image includes moving an internal portion of the transport instrument that is configured to hold the thermal image capture device while remaining stationary in position.

In some aspects, the techniques described herein relate to a device, wherein the thermal image includes an integrated image from a visual image capture device and a thermal image capture device.

In some aspects, the techniques described herein relate to a method for monitoring a temperature of an asset located within an environment, the method including: receiving a thermal image of the environment that includes an asset by using a thermal image capture device positioned on a transport instrument that is instructed to patrol the environment, wherein the transport instrument moves within the environment in an autonomous or semi-autonomous manner; identifying the asset from a database of assets; determining at least one region of interests of the asset where temperature measurement is to be performed; adjusting movement of the transport instrument for successful processing of the thermal image; and calculating at least one temperature value of the asset.

In some aspects, the techniques described herein relate to a method, further including: providing the thermal image to a machine learning model; and receiving an output from the machine learning network in response to the machine learning model that is related to a processed result of the thermal image based at least in part on a detection model, wherein the output includes one or more regions of interests of the asset.

In some aspects, the techniques described herein relate to a method, wherein the detection model includes a regions of interest (ROI) detection model trained based at least in part on a set of base thermal images associated with a type of the asset that is prepared prior to capturing the thermal image.

In some aspects, the techniques described herein relate to a method, wherein each of the one or more regions of interest are prepared from one or more pre-determined image positions within the thermal image.

In some aspects, the techniques described herein relate to a method, wherein identifying and determining temperature for one region of interest of the asset includes calculating temperature value based on each pixel value of one or more regions of interest.

In some aspects, the techniques described herein relate to a method, wherein the temperature includes at least one of: a maximum temperature value, a minimum temperature value, a mean temperature value, or a median temperature value.

In some aspects, the techniques described herein relate to a method, wherein: the thermal image includes at least one object located within the environment that is used for identification purpose of the asset or the identification of the location of the asset; and the processed result is obtained through mapping the at least one object included in a portion of the thermal image with a reference image based at least in part on the machine learning model.

In some aspects, the techniques described herein relate to a method, wherein the reference image is obtained based at least in part on the machine learning network, wherein the machine learning model is trained based on a set of images associated with the asset, and wherein the set of images are transformed via at least one of cropping, blurring, rotating, or brightness adjustment.

In some aspects, the techniques described herein relate to a method, wherein the reference image includes the one or more regions of interest, wherein each of the one or more regions of interest correspond to a predetermined part of the asset.

In some aspects, the techniques described herein relate to a method, wherein the reference image includes a digitally created image for the asset identification purpose that is significantly reduced in size as compared to a corresponding color image in order to speed up the identification process.

In some aspects, the techniques described herein relate to a method, wherein the reference image is created from a machine learning model.

In some aspects, the techniques described herein relate to a method, wherein the mapping the at least one object includes mapping an image coordinate of the thermal image to an image coordinate of the reference image based at least in part on the machine learning model.

In some aspects, the techniques described herein relate to a method, wherein the mapping is performed based on a transformation of a captured thermal image through a protective transformation.

In some aspects, the techniques described herein relate to a method, wherein the affine transformation includes a homography matrix conversion.

In some aspects, the techniques described herein relate to a method, wherein the transport instrument is configured to move in accordance with whether the mapping is successfully achieved after the transformation.

In some aspects, the techniques described herein relate to a method, wherein the mapping the at least one object includes a remapping process where the image coordinate of the thermal image is updated to a different set of coordinates, resulting in a different region of the thermal image being mapped.

In some aspects, the techniques described herein relate to a method, wherein the transport instrument is configured to adjust an angle of image capture in accordance with a result of the processed thermal image.

In some aspects, the techniques described herein relate to a method, wherein the transport instrument is configured to adjust a distance of image capture in accordance with a result of the processed thermal image.

In some aspects, the techniques described herein relate to a method, wherein the transport instrument is configured to adjust a location of image capture in accordance with a result of the processed thermal image.

In some aspects, the techniques described herein relate to a method, further including capturing a color image of the environment by using an additional image capture device positioned on the transport instrument.

In some aspects, the techniques described herein relate to a method, wherein the identifying the asset from the database of assets includes processing the color image.

In some aspects, the techniques described herein relate to a method, wherein the determining the at least one region of interests of the asset includes processing the color image.

In some aspects, the techniques described herein relate to a method, wherein the thermal image includes an integrated image from a visual image capture device and a thermal image capture device.

In some aspects, the techniques described herein relate to a method, wherein the identifying the asset from the database of assets includes processing the thermal image.

In some aspects, the techniques described herein relate to a method, wherein the determining the at least one region of interests of the asset includes processing the thermal image.

In some aspects, the techniques described herein relate to a method, wherein the identifying the asset from the database of assets includes mapping the thermal image to an image template that is generated based on a machine learning model.

In some aspects, the techniques described herein relate to a method, wherein the calculating at least one temperature value of the asset includes processing an ambient temperature of the environment where the asset is located.

In some aspects, the techniques described herein relate to a method, wherein the calculating at least one temperature value of the asset includes computing operation time that is indicative of how much time the asset is in an operation mode.

In some aspects, the techniques described herein relate to a computer-implemented method of training a neural network for asset detection including: collecting a set of digital asset images from a database; applying one or more transformations to each digital asset image, including mirroring, rotating, smoothing, sharpening, blurring, increasing contrast, increasing saturation, increasing brightness, decreasing contrast, decreasing saturation, decreasing brightness, cropping, zooming in, or zooming out to create a modified set of digital asset images; creating a first training set including the collected set of digital asset images, the modified set of digital asset images, and a set of digital non-asset images; training the neural network in a first stage using the first training set; creating a second training set for a second stage of training including the first training set and digital non-asset images that are incorrectly detected as asset images after the first stage of training; and training the neural network in the second stage using the second training set.

A system on a chip (SoC) including any one or more of the above aspects or aspects of the embodiments described herein.

One or more means for performing any one or more of the above aspects or aspects of the embodiments described herein.

Any aspect in combination with any one or more other aspects.

Any one or more of the features disclosed herein.

Any one or more of the features as substantially disclosed herein.

Any one or more of the features as substantially disclosed herein in combination with any one or more other features as substantially disclosed herein.

Any one of the aspects/features/embodiments in combination with any one or more other aspects/features/embodiments.

Use of any one or more of the aspects or features as disclosed herein.

Any of the above aspects, wherein the data storage comprises a non-transitory storage device, which may further comprise at least one of: an on-chip memory within the processor, a register of the processor, an on-board memory co-located on a processing board with the processor, a memory accessible to the processor via a bus, a magnetic media, an optical media, a solid-state media, an input-output buffer, a memory of an input-output component in communication with the processor, a network communication buffer, and a networked component in communication with the processor via a network interface.

It is to be appreciated that any feature described herein can be claimed in combination with any other feature(s) as described herein, regardless of whether the features come from the same described embodiment.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible, non-transitory medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112 (f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures:

FIG. 30 depicts a collage comprising asset images in accordance with embodiments of the present disclosure; and FIG. 31 depicts a collage comprising asset images in accordance with embodiments of the present disclosure.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising a numeric reference number, without an alphabetic sub-reference identifier when a sub-reference identifier exists in the figures, when used in the plural, is a reference to any two or more elements with the like reference number. When such a reference is made in the singular form, but without identification of the sub-reference identifier, it is a reference to one of the like numbered elements, but without limitation as to the particular one of the elements being referenced. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
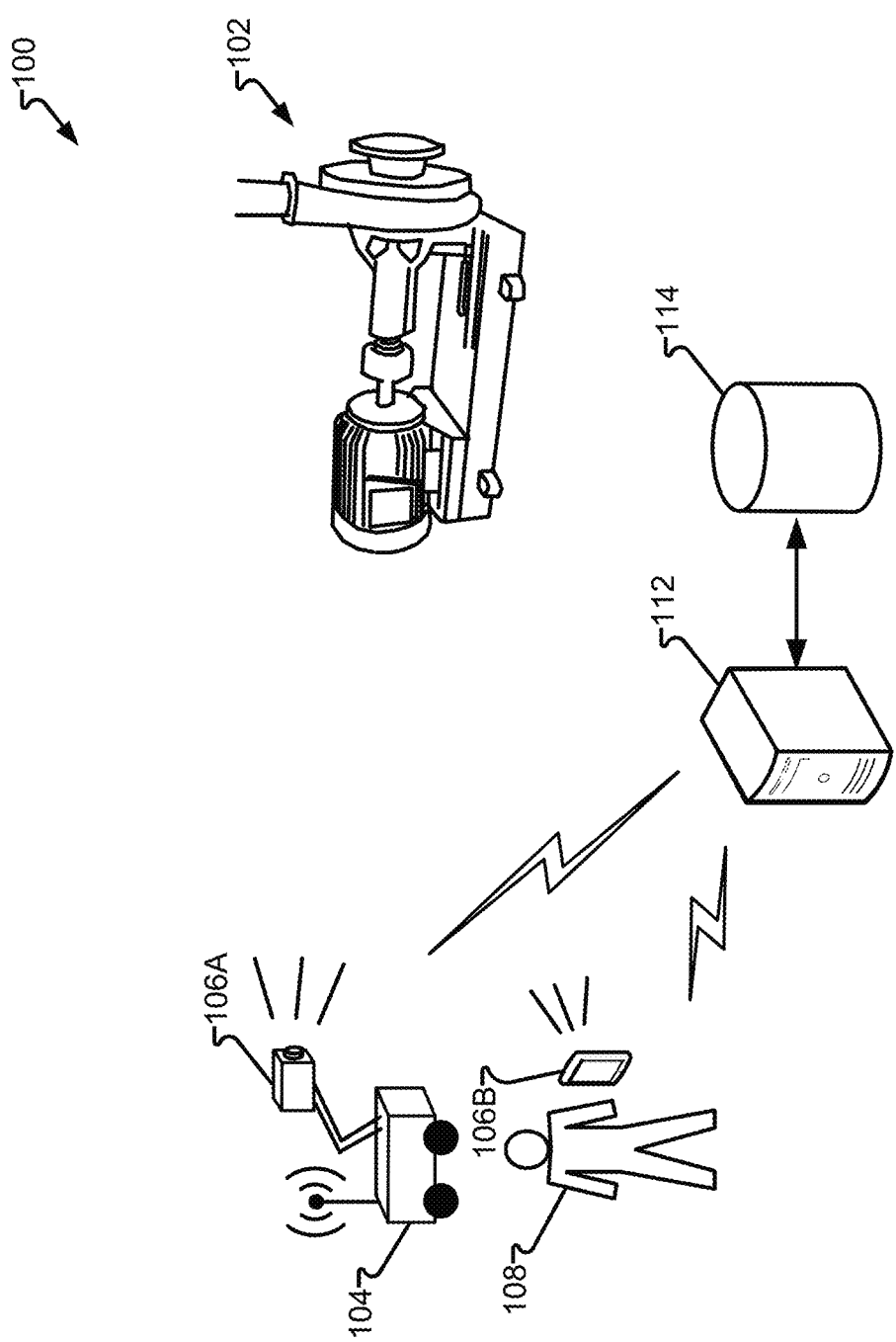
FIG. 1 depicts a system in accordance with embodiments of the present disclosure.

FIG. 1 depicts system 100 in accordance with embodiments of the present disclosure. Image capture device 106A-B may be utilized to capture images of asset 102. Image capture device 106A-B may be configured to capture images in the visible spectrum and/or infrared spectrum. Image capture device 106A-B may be embodied as a single device or a system of multiple devices, such as one device capturing visible images, one device capturing infrared images, etc. Image capture device 106A-B may further comprise a display, communication interface, user input-output interface, and/or other computing, communication, data storage, and usability components.

In one embodiment, image capture device 106A is operated by transport instrument 104. Transport instrument 104 may be remotely operated, such as by a human controlled transport instrument 104 via a radio or other communication link, semi-autonomous (e.g., autonomously performing certain navigation or movement functions), or fully autonomous (e.g., receiving a task and performing all actions required to execute the task). In another embodiment, transport instrument 104 may comprise an equipment carried by a human operator/user to patrol an environment. The equipment may further comprise a visual image capture device, a thermal image capture device and/or other image capture device. Transport instrument 104 may be configured with components to travel on or in various media, such as over the surface of the Earth or in a facility, in air, in or on water, or in industrial environments (e.g., an interior pipeline).

When fully or partially autonomous, transport instrument 104 may instruct or otherwise control image capture device 106A, such as to position image capture device 106A at a target or preferred location in order to image asset 102.

In another embodiment, locomotion is provided to image capture device 106B via human 108. Human 108 may carry or otherwise move image capture device 106B. Accordingly, image capture device 106B may be configured for imaging under ambient conditions or submarine, aerial, or other environments. Image capture device 106B may be otherwise autonomous (e.g., capturing images when arrival at a target location is detected or when at a distance/angle to an asset to be imaged is detected, etc.). In other embodiments, image capture device 106B may advise human 108 to capture an image and/or adjust the placement or orientation of image capture device 106B as a prerequisite to capturing an asset's image, which may be performed automatically or via input from human 108. Additionally or alternatively, a partially captured image of asset 102 may cause image capture device 106A to direct transport instrument 104 to move or position in a manner that enables capturing of the entire asset 102 or a target (e.g., region of interest) of asset 102. Similarly, image capture device 106B may provide audio, visual, or haptic feedback to human 108 to direct human 108 to position or move to a location where the entire or target region of asset 102 may be imaged.

Generally, image capture device 106 is optimized to capture images in the field and may be absent sufficient data processing or storage capacity. Accordingly, in another environment, image capture device 106 may be configured to communicate with server 112, data storage 114, or other computing or storage devices. Communications may include receiving images from image capture device 106 and/or providing imaging instructions to image capture device 106 (directly or via transport instrument 104 or human 108). Communication between image capture device 106 may be continuous or intermittent (e.g., when physically connected with a data cable, when radio frequency communications are active, etc.).

In addition to capturing images of asset 102, image capture device 106 may be equipped with sensors, instrumentation, or input components to capture inputs from human 108, ambient conditions (e.g., temperature, humidity, air pressure, etc.), temporal information (e.g., time/date), location information (e.g., GPS coordinates, x-y coordinates of a facility, distance to asset, etc.), orientation information (e.g., altitude, angle, etc.), settings (e.g., zoom level, alpha correction, contrast, brightness, color enhancement, etc.). For infrared imaging, settings may further include false color transformation settings to convert infrared values into human-understandable colors, such as a blue overlay applied to an image to indicate cooler temperatures and a red overlay applied to indicate hotter temperatures. The false color settings may be set relative to asset 102 or the environment of asset 102 or an environment. For example, a steel foundry may consider 1000° F. (537° C.) to be cool, and therefore displayed as a blue overlay, whereas a petroleum cracking tower operating at 1000° F. (537° C.) may be abnormally hot, and therefore displayed as red or white. In another example, the false color settings may be determined on an image basis such as to apply blue to the cold portions within an image and red or white to the hottest portions of the image.

In another embodiment, an observed temperature of asset 102 or a portion thereof may be evaluated against an alarm condition, such as a high temperature alarm. Image capture device 106 and/or server 112 may determine the observed temperature meets the alarm condition and automatically alert other systems of the condition, such as to cause the system to take a mitigating action that would alleviate the alarm condition.

Figure 2:
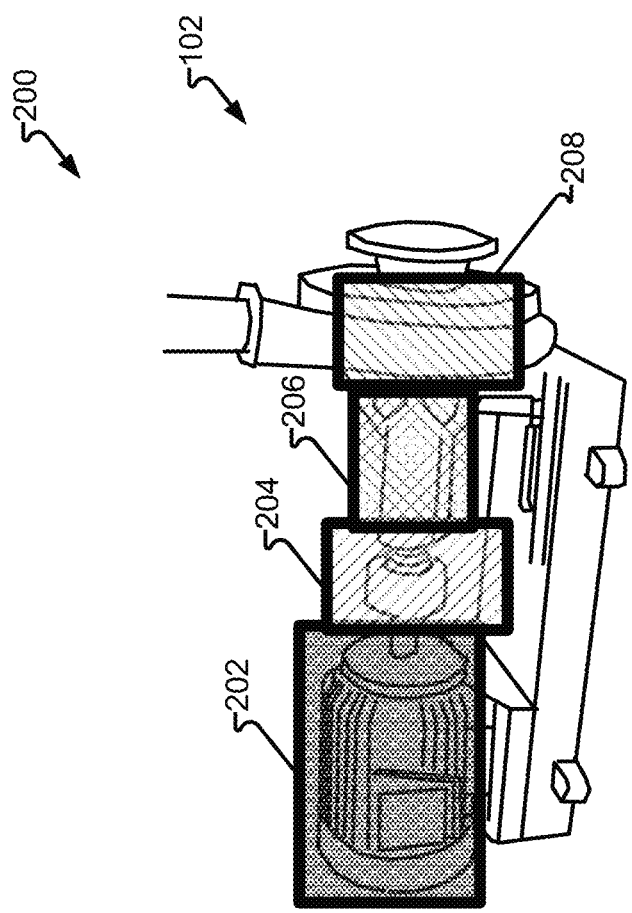
FIG. 2 depicts an asset image in accordance with embodiments of the present disclosure.

FIG. 2 depicts asset image 200 in accordance with embodiments of the present disclosure. In one embodiment, asset 102 is imaged to produce asset image 200. Asset image 200 is further overlayed with bounding boxes, specifically, bounding box 202, bounding box 204, bounding box 206, and bounding box 208. Each bounding box 202-208 corresponds to an area of interests, and an area of interests may include a portion of asset 102, such as motor, bearing, reduction gear, pump, etc. While bounding boxes 202, 204, 206, and 208 are illustrated as rectangles, it should be appreciated that bounding boxes of other closed geometries, such as regular geometries (e.g., circle, triangle, ellipse, etc.) or irregular geometries (e.g., free-form shapes) may be utilized.

In another embodiment, each of bounding boxes 202-208 may be determined by a human operator. In another embodiment, each of bounding boxes 202-208 may be determined by an automated process, such as a neural network trained to identify components of asset 102.

Coloring (illustrated as crosshatching) may be applied to visually indicate a temperature (maximum, median, minimum, etc.) of a portion of the bounding boxes 202-208.

Figure 3:
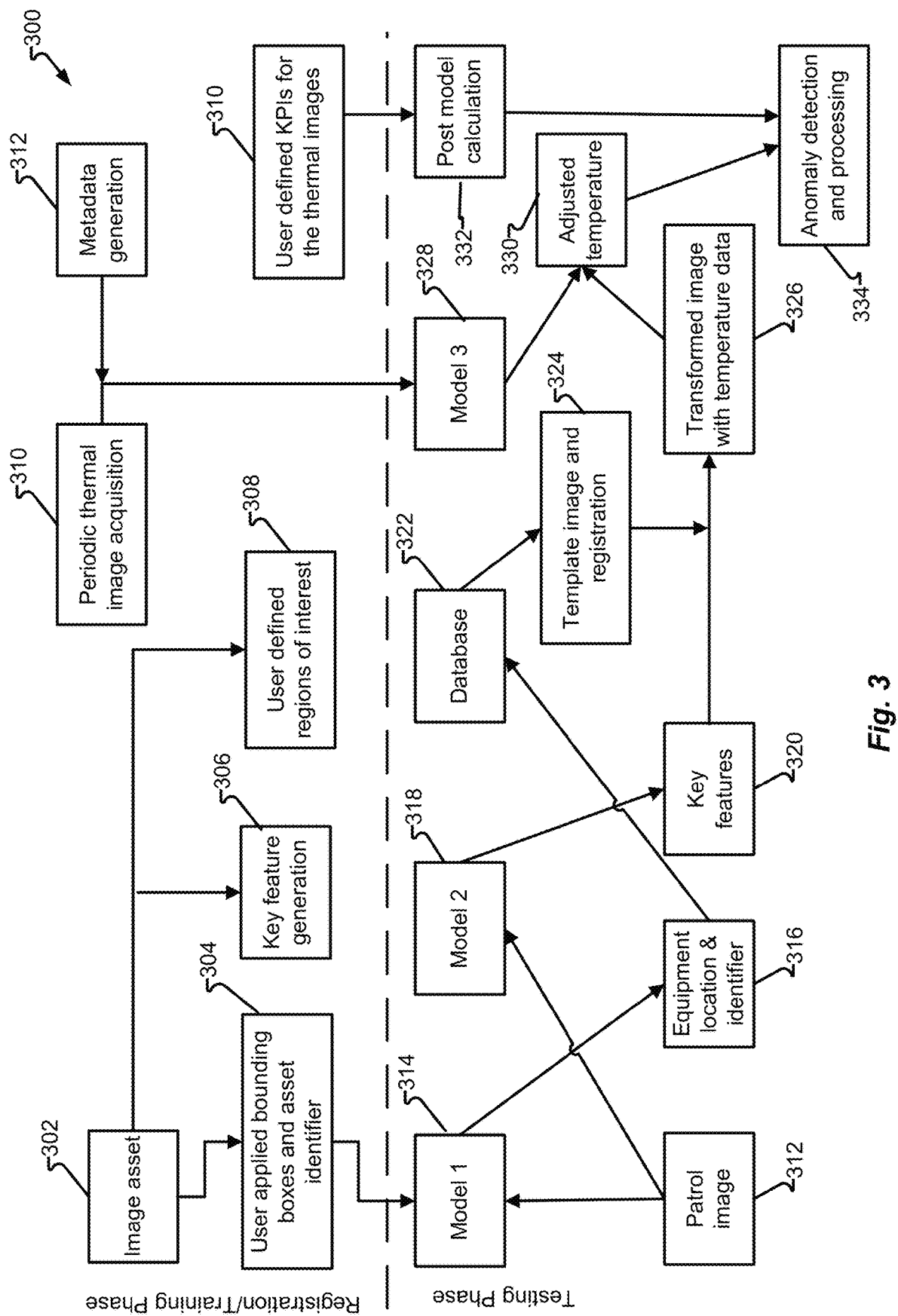
FIG. 3 depicts a data flow in accordance with embodiments of the present disclosure.

FIG. 3 depicts data flow 300 in accordance with embodiments of the present disclosure. In one embodiment, certain steps of data flow 300 are embodied as machine-readable instructions maintained in a non-transitory memory that when read by a machine, such as processors of a server, cause the machine to execute the instructions and thereby execute portions of data flow 300. The processor of the server may include, but is not limited to, at least one processor of server 112.

In one embodiment, data flow 300 may be segmented into phases, such as a registration/training phase and a testing phase. During a registration phase, a user uploads one or more images of an asset in step 302 and defines one or more areas of interest and corresponding identifiers in the image(s) in step 302. Areas of interest may be identified for each image and label the portion imaged in the area of interest. If more than one area of interest is present in each of the images, one portion may be obscured (e.g., blacked out) so as to avoid errors when a second portion is the subject of training or an analysis.

Certain key features are generated by computer vision in key feature generation step 306. Key features (or key points) are machine-determined points of significance, such as may indicate points indicative of a particular asset or feature of an asset in an image. Step 308 allows a user to define regions of interest.

A neural network, as is known in the art and in one embodiment, self-configures layers of logical nodes having an input and an output. If an output is below a self-determined threshold level, the output is omitted (i.e., the inputs are within the inactive response portion of a scale and provide no output). If the self-determined threshold level is above the threshold, an output is provided (i.e., the inputs are within the active response portion of a scale and provide an output). The particular placement of the active and inactive delineation is provided as a training step or steps. Multiple inputs into a node produce a multi-dimensional plane (e.g., hyperplane) to delineate a combination of inputs that are active or inactive.

Model 1 (314) receives the images, bounding boxes, identifiers, key features, and regions of interest (steps 304, 306, and 308) for training. Model 1 (314) may comprise a training of a deep learning network, such as via a neural network, in order for the neural network to later determine an asset identifier (e.g. tag) when provided with an image of the asset. Model 1 (314) may have access to a database of assets and descriptions thereof in order to automatically identify an asset or to eliminate irrelevant assets from further consideration. For example, an asset with a motor and impeller and connected to piping may be identified as a pump, or at least identified as not being a drive for a conveyer belt. Images may be manually and/or automatically subject to transformations including, but not limited to, rotation, change in contrast, change in brightness (image wide and image portions), blurring, sharpening, zooming in, zooming out, partial obscuring, cropping, etc. During a testing phase, Model 1 (314) receives a new image, such as an image taken by image capture device 106, in step 312, then automatically identifies the asset and location in step 316 based on Model 1. After determining the asset identifier, registration information is provided to database 322 for use in subsequent models.

Model 1 (314) automatically identifies the asset from the image information, thereby avoiding the need for manual look-up of the asset. If the asset cannot be specifically identified, a class of assets may be identified (e.g., one of the twenty recirculating pumps may be identified). Additionally or alternatively, asset tags or other indicia on or proximate to the asset may be imaged and analyzed to identify the asset. In another embodiment, the thermal (alone or in addition to the visual) images and the heat pattern therein are used to identify the asset.

In another embodiment, in model 2 (318) a registration phase and a testing phase may be performed. During the registration phase, an image is taken for each asset, and a domain expert labels the region of interest (e.g. winding area for a pump) using shapes (e.g., boxes, polygons, circles, etc.) to be monitored for each asset and saved to a database.

A computer vision algorithm, such as scale invariant feature transform (SIFT), automatically generates features (or key points) for each asset to be presented to the neural network for training by model 2 (318). Model 1 (314) and model 2 (318) may be the same, but differently trained, neural network or discrete neural networks. While in training model 2 (318) transformations of images are provided, including, but not limited to, rotation, change in contrast, change in brightness (image wide and image portions), blurring, sharpening, zooming in, zooming out, partial obscuring, cropping, etc. Model 2 (318) receives testing images comprising visible and/or infrared imaging for use in identifying key features 320.

Model 1 (314) could automatically identify the asset (e.g. equipment) and the location of asset in step 316, such as coordinates on grid, GPS coordinates, etc. based on the registration information. This registration information includes a template image/reference image and the position (x, y) coordinates of each key point in the training image. A one-to-one mapping of (x, y) coordinates is performed between template image key points (saved in the database) and testing image key points (identified by model 2 (318)). A bad match may be filtered based on mathematical properties, such as a mathematical matrix configured with information that transforms the visible light testing image to identify a best match to one of a number of stored images 324 accessed from database 322. This matrix may also be applied on the infrared red testing image to transform the position of the temperature values in the same way. For example, an image may need to be transformed in step 326, such as translated (up, down, left, right), de-rotated, and/or other transformations to then match the template image.

After the transformation in step 326, each region of interest is defined, the temperature information (e.g., pixel location, line, key point, etc.) for each pixel value in the region of interest is obtained from the test infrared red image, and temperature values (e.g., minimum, mean, maximum, etc.) are calculated and adjusted temperatures determined in step 330. Temperature values comprise statistical measures associated with temperature, which are mathematical analyses used to summarize the characteristics of a data set. Statistical measures associated with temperature may be, for example, but not limited to, mean temperature value, median temperature value, mode temperature value, percentiles temperature value, range of temperature value, variance of temperature value, and standard deviation of temperature value.

In another embodiment, the asset comprises livestock, such as a cow. The regions of interest may include various body parts such as the head (brain) and/or ears. Each photo taken of the cow will look different as the cow will likely be in a different orientation to image capture device 106 or in a different body position, lighting, etc. Each thermal image is adjusted, such that the final region(s) of interests are detected correctly for accurate temperature calculations, without a human observing or assessing the data collected.

Model 2 (318) automatically detects asset key points, generating a mathematical matrix that transforms the visible light and infrared red image to correct for changes in image orientations and perspectives that do not affect temperature calculations. Referencing the livestock example above, model 2 (318) can correct an image taken from a different distance to the cow, orientation of the cow to image capture device 106, etc.

In step 330, performed after model 1 (314) and model 2 (318) have identified the asset and adjusted the image (e.g., patrol image), such as by adjusting the temperature values calculated from each region of interest.

Model 3 (328) comprises a machine learning model, such as a neural network, and is used for adjusting temperatures calculated for each region of interest identified by Model 2 (318). During a training phase, over a training period of a specified time, a user collects thermal images of each asset, such as over a course of many days. Metadata of each image is saved, such as the time taken, distance of user to the equipment, current room temperature, and other factors that influence temperature measurement. These metadata are treated as independent variables (X) that influence the current temperature (Y) of each region of interest. Using suitable mathematical formulas, a model is built that predicts the average expected temperature given the metadata. Next, a reference point is defined with one selected data point out of all the data collected during the training period, determined by a domain expert identifying the ideal metadata Z that is commonly occurring and/or easy to understand.

For each thermal image during testing, the third model successfully uses the current temperature (Y) and current metadata to calculate an adjusted temperature (A) similar to the reference point during the training phase. The adjusted temperature for each region of interest is saved into the server in step 330.

A user may define a set of key performance indicators for the thermal images in step 310. Model 3 (328) uses the adjusted temperatures in step 330, and a set of metrics or key performance indicators (KPIs) are automatically calculated in step 332 to detect if there are any issues or abnormalities with the equipment in step 334. An example of a KPI would be the temperature difference between one region of interest and another region of interest, and if this temperature difference exceeds by N degree Celsius. As all temperatures recorded have been adjusted or modified by the three models, the final KPIs calculated are fully automated, are reliable, and do not require human supervision or intervention.

In step 334, in a post model analysis, the adjusted temperatures for each region of interest can be used directly for KPI calculation and further analysis by users, as it has already accounted for both metadata variations and image-taking variations. Step 334 may trigger alarms or automatic actions (e.g., load reduction, plant slowdown, etc.) if a temperature condition exceeds a previously determined threshold.

Figure 4:
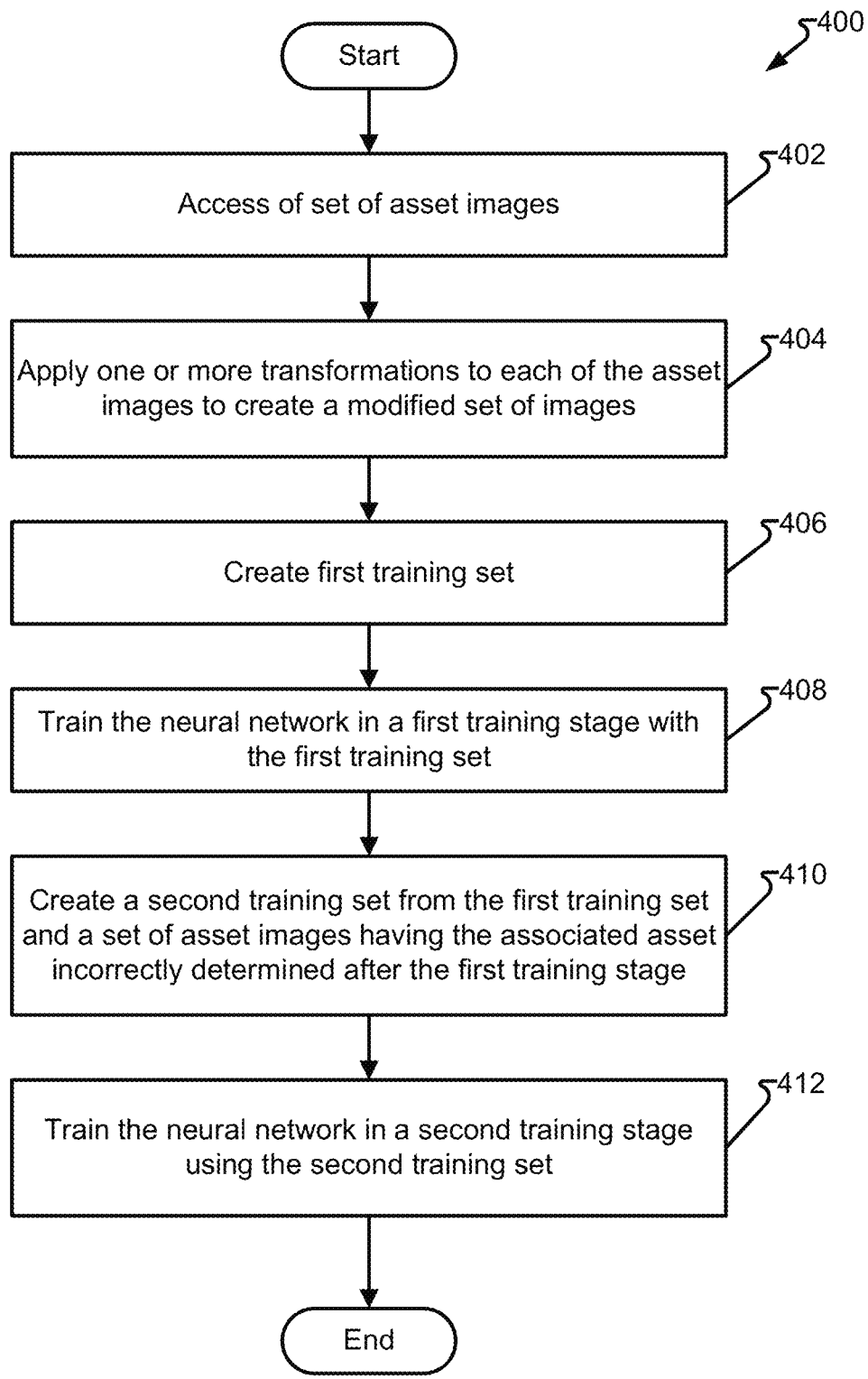
FIG. 4 depicts a process in accordance with embodiments of the present disclosure.

FIG. 4 depicts process 400 in accordance with embodiments of the present disclosure. In one embodiment, process 400 is embodied as machine-readable instructions maintained in a non-transitory memory that when read by a machine, such as processors of a server, cause the machine to execute the instructions and thereby execute process 400. The processor of the server may include, but is not limited to, at least one processor of server 112.

In one embodiment, process 400 begins and, in step 402, a set of digital asset images are collected from a database or other data repository. In step 404, one or more transformations are applied to each digital asset image including mirroring, rotating, smoothing, sharpening, blurring, increasing contrast, increasing saturation, increasing brightness, decreasing contrast, decreasing saturation, decreasing brightness, cropping, zooming in, or zooming out, to create a modified set of digital asset images.

Step 406 creates a first training set comprising the collected set of digital asset images, the modified set of digital asset images, and a set of digital non-asset images. Step 408 trains the neural network in a first training stage using the first training set. Step 410 creates a second training set for a second training stage comprising the first training set and digital non-asset images that are incorrectly detected as asset images after the first training stage. Step 412 trains the neural network in the second training stage using the second training set.

In another embodiment, the images of the set of digital asset images and/or images of the modified set of digital images may be visible spectrum images or infrared images comprising indicia of temperature, such as false colors to translate relative heat levels to visible colors.

Figure 5:
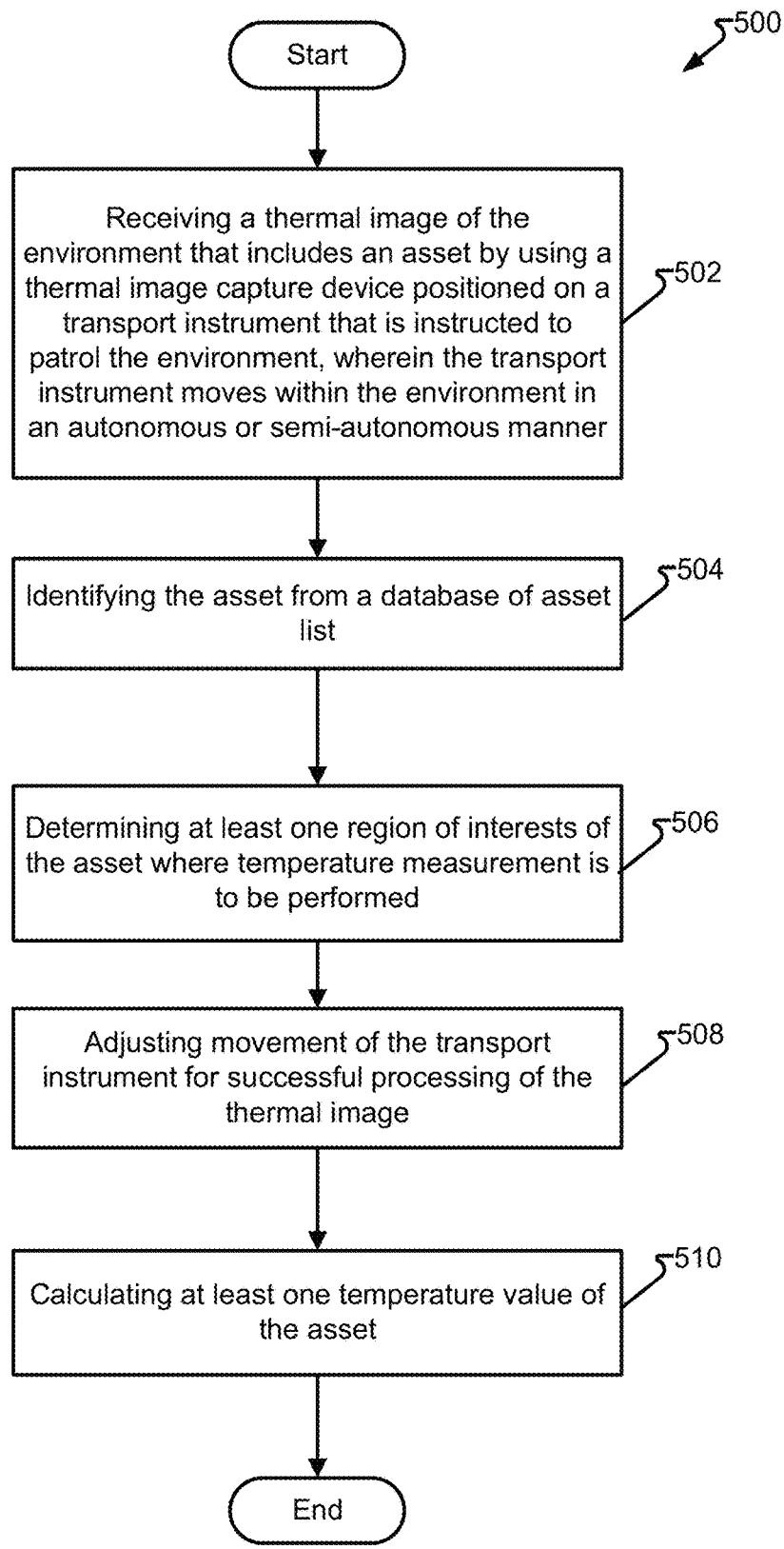
FIG. 5 depicts a process in accordance with embodiments of the present disclosure.

FIG. 5 depicts process 500 in accordance with embodiments of the present disclosure. In one embodiment, process 500 is embodied as machine-readable instructions maintained in a non-transitory memory that when read by a machine, such as processors of a server, cause the machine to execute the instructions and thereby execute process 500. The processor of the server may include, but is not limited to, at least one processor of server 112.

Process 500 begins and step 502 performs receiving a thermal image of the environment that includes an asset by using a thermal image capture device positioned on a transport instrument that is instructed to patrol the environment, wherein the transport instrument moves within the environment in an autonomous or semi-autonomous manner.

Step 504 performs identifying the asset from a database of assets.

Step 506 performs determining at least one region of interests of the asset where temperature measurement is to be performed.

Step 508 performs adjusting movement of the transport instrument for successful processing of the thermal image.

Step 510 performs calculating at least one temperature value of the asset.

Figure 6:
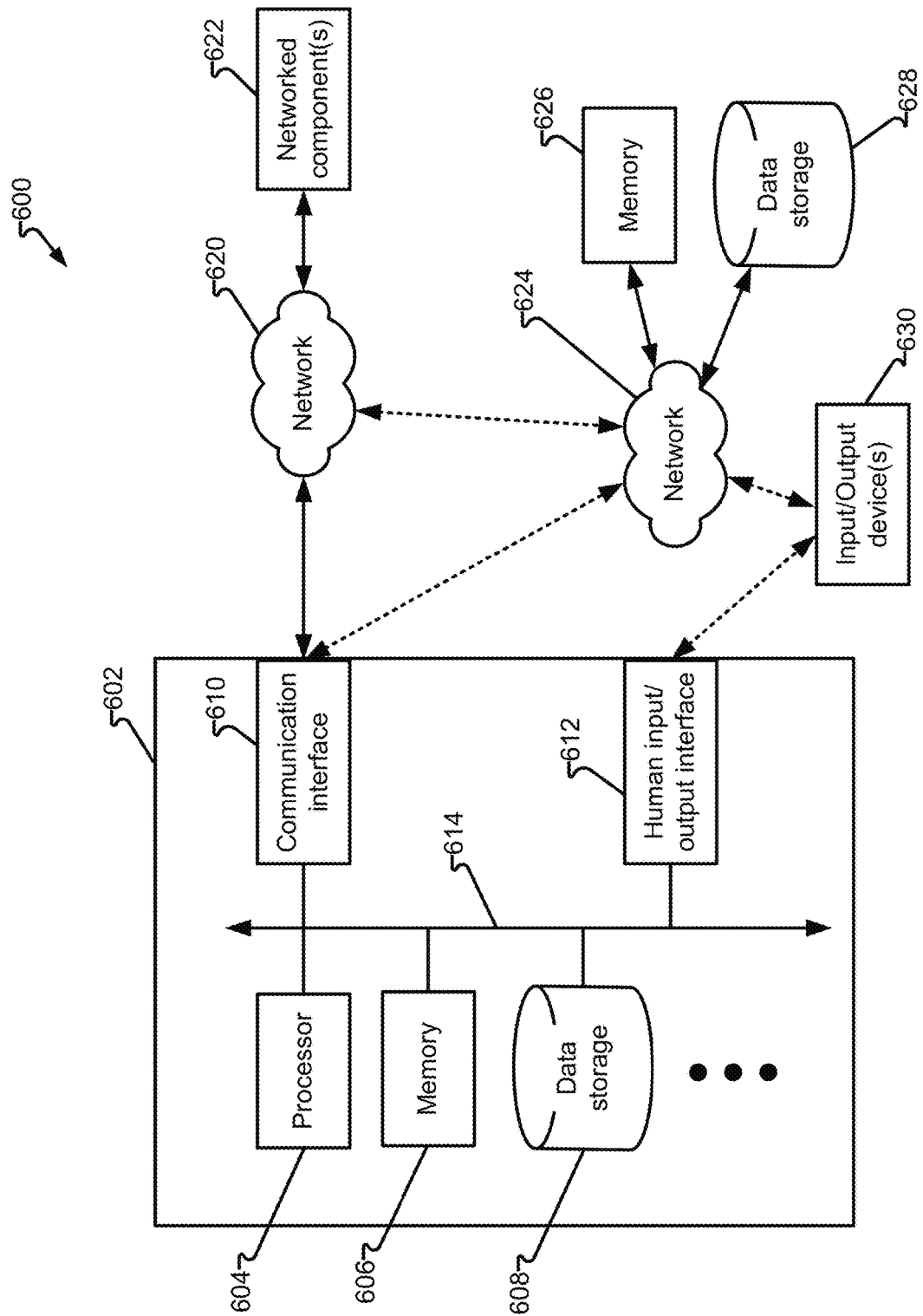
FIG. 6 depicts a device in a system in accordance with embodiments of the present disclosure.

FIG. 6 depicts device 602 in system 600 in accordance with embodiments of the present disclosure. In one embodiment, comprising various components and connections to other components and/or systems. The components are variously embodied and may comprise processor 604. The term "processor," as used herein, refers exclusively to electronic hardware components comprising electrical circuitry with connections (e.g., pin-outs) to convey encoded electrical signals to and from the electrical circuitry. Processor 604 may comprise programmable logic functionality, such as determined, at least in part, from accessing machine-readable instructions maintained in a non-transitory data storage, which may be embodied as circuitry, on-chip read-only memory, computer memory 606, data storage 608, etc., that cause the processor 604 to perform the steps of the instructions. Processor 604 may be further embodied as a single electronic microprocessor or multiprocessor device (e.g., multicore) having electrical circuitry therein which may further comprise a control unit(s), input/output unit(s), arithmetic logic unit(s), register(s), primary memory, and/or other components that access information (e.g., data, instructions, etc.), such as received via bus 614, executes instructions, and outputs data, again such as via bus 614. In other embodiments, processor 604 may comprise a shared processing device that may be utilized by other processes and/or process owners, such as in a processing array within a system (e.g., blade, multi-processor board, etc.) or distributed processing system (e.g., "cloud", farm, etc.). It should be appreciated that processor 604 is a non-transitory computing device (e.g., electronic machine comprising circuitry and connections to communicate with other components and devices). Processor 604 may operate a virtual processor, such as to process machine instructions not native to the processor (e.g., translate the VAX operating system and VAX machine instruction code set into Intel® 9xx chipset code to enable VAX-specific applications to execute on a virtual VAX processor). However, as those of ordinary skill understand, such virtual processors are applications executed by hardware, more specifically, the underlying electrical circuitry and other hardware of the processor (e.g., processor 604). Processor 604 may be executed by virtual processors, such as when applications (i.e., Pod) are orchestrated by Kubernetes. Virtual processors enable an application to be presented with what appears to be a static and/or dedicated processor executing the instructions of the application, while underlying non-virtual processor(s) are executing the instructions and may be dynamic and/or split among a number of processors.

In addition to the components of processor 604, device 602 may utilize computer memory 606 and/or data storage 608 for the storage of accessible data, such as instructions, values, etc. Communication interface 610 facilitates communication with components, such as processor 604 via bus 614 with components not accessible via bus 614 and may be embodied as a network interface (e.g., ethernet card, wireless networking components, USB port, etc.). Communication interface 610 may be embodied as a network port, card, cable, or other configured hardware device. Additionally or alternatively, human input/output interface 612 connects to one or more interface components to receive and/or present information (e.g., instructions, data, values, etc.) to and/or from a human and/or electronic device. Examples of input/output devices 630 that may be connected to input/output interface include, but are not limited to, keyboard, mouse, trackball, printers, displays, sensor, switch, relay, speaker, microphone, still and/or video camera, etc. In another embodiment, communication interface 610 may comprise, or be comprised by, human input/output interface 612. Communication interface 610 may be configured to communicate directly with a networked component or configured to utilize one or more networks, such as network 620 and/or network 624.

Network 620 may be a wired network (e.g., Ethernet), wireless (e.g., WiFi, Bluetooth, cellular, etc.) network, or combination thereof and enable device 602 to communicate with networked component(s) 622.

Additionally or alternatively, one or more other networks may be utilized. For example, network 624 may represent a second network, which may facilitate communication with components utilized by device 602. For example, network 624 may be an internal network to a business entity or other organization, whereby components are trusted (or at least more so) than networked components 622, which may be connected to network 620 comprising a public network (e.g., Internet) that may not be as trusted.

Components attached to network 624 may include computer memory 626, data storage 628, input/output device(s) 630, and/or other components that may be accessible to processor 604. For example, computer memory 626 and/or data storage 628 may supplement or supplant computer memory 606 and/or data storage 608 entirely or for a particular task or purpose. As another example, computer memory 626 and/or data storage 628 may be an external data repository (e.g., server farm, array, "cloud," etc.) and enable device 602, and/or other devices, to access data thereon. Similarly, input/output device(s) 630 may be accessed by processor 604 via human input/output interface 612 and/or via communication interface 610 either directly, via network 624, via network 620 alone (not shown), or via networks 624 and 620. Each of computer memory 606, data storage 608, computer memory 626, and data storage 628 comprise a non-transitory data storage comprising a data storage device.

It should be appreciated that computer readable data may be sent, received, stored, processed, and presented by a variety of components. It should also be appreciated that components illustrated may control other components, whether illustrated herein or otherwise. For example, one input/output device 630 may be a router, a switch, a port, or other communication component such that a particular output of processor 604 enables (or disables) input/output device 630, which may be associated with network 620 and/or network 624, to allow (or disallow) communications between two or more nodes on network 620 and/or network 624. One of ordinary skill in the art will appreciate that other communication equipment may be utilized, in addition or as an alternative, to those described herein without departing from the scope of the embodiments.

Figure 7:
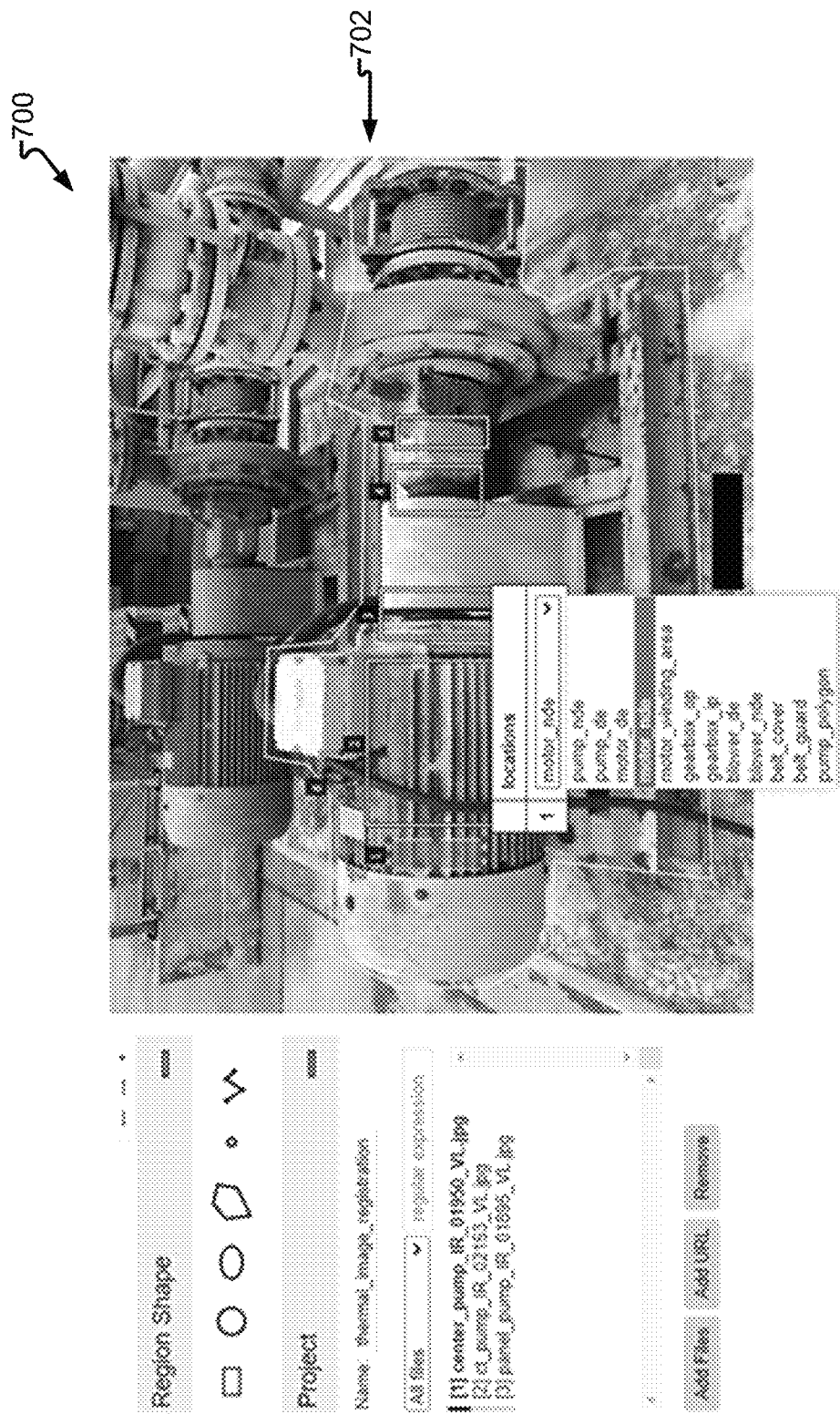
FIG. 7 depicts a user interface with asset image in accordance with embodiments of the present disclosure.

FIG. 7 depicts user interface 700 with asset image 702 in accordance with embodiments of the present disclosure. In one embodiment, user interface 700 provides an interface to a computer (e.g., server 112) to execute a registration phase. During registration, a user (e.g., user 108) uploads multiple images with the equipment, such as a pump. The user defines multiple regions of interest using the region shape tool, and selects a location type based on the predefined regions of interest (e.g., "1", "2", "3", "4", "5", and "6"), such as via use of VGG Image Annotator.

The user may also define a region containing the equipment (e.g., pump_polygon location). For example, if a registration image comprises two pumps then the correct pump is defined in order to reference for temperature calculations and transforming the images correctly.

In another embodiment, the background outside of the pump_polygon will be removed and blacked out before auto generating key features for Model 2, ensuring that testing images are matched to the correct pump for accurate transformation of data.

Figure 8:
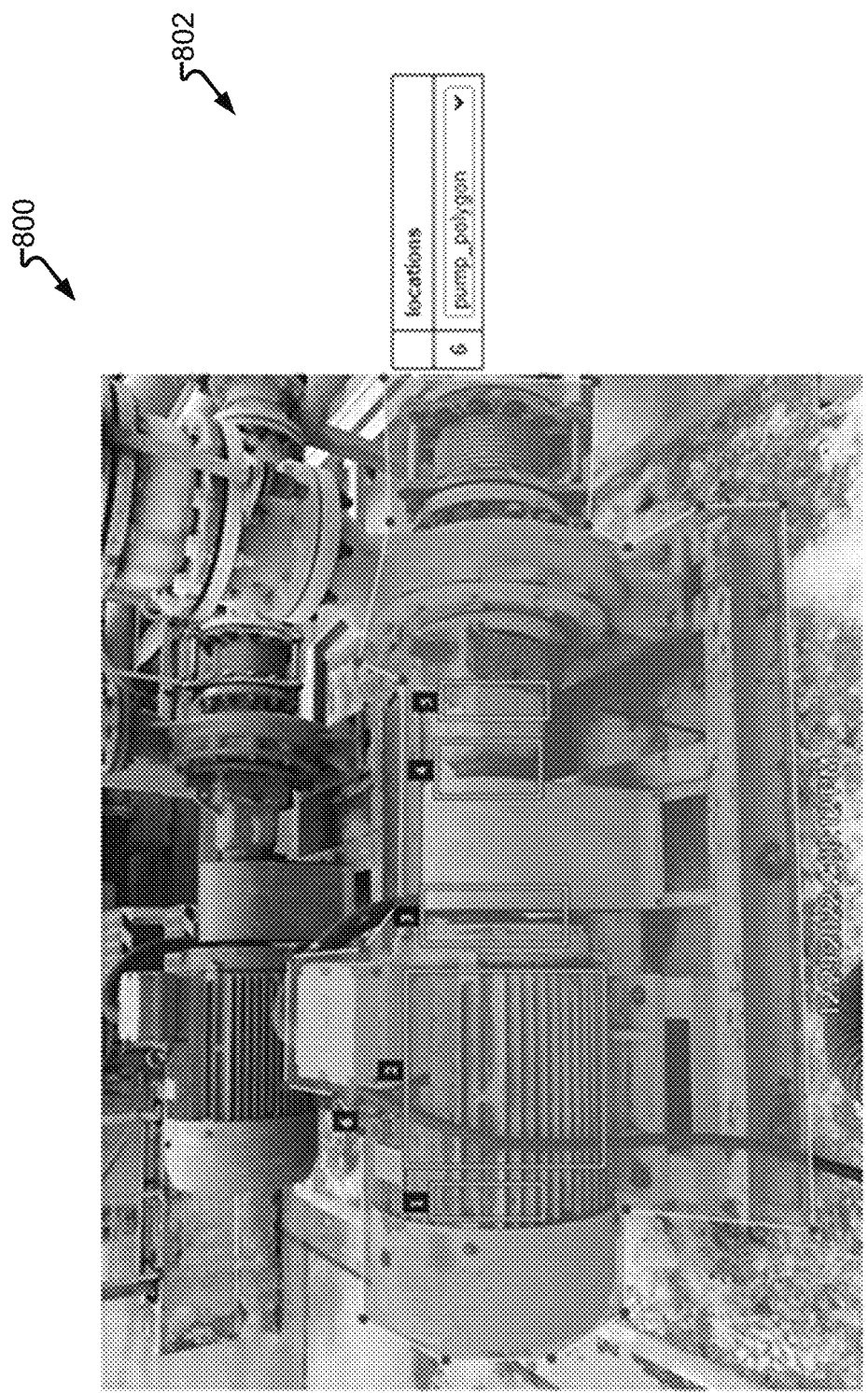
FIG. 8 depicts a user interface with asset image in accordance with embodiments of the present disclosure.
Figure 9:
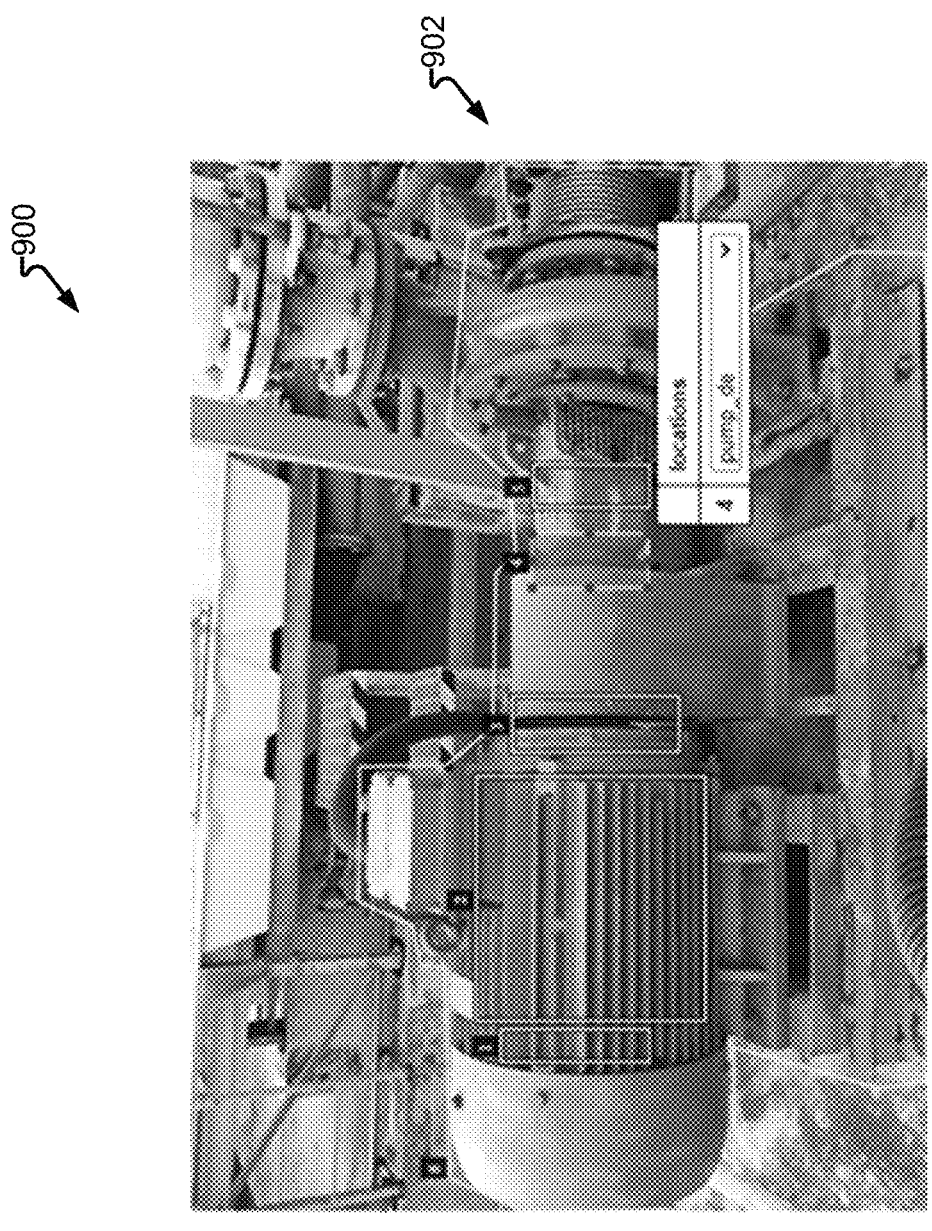
FIG. 9 depicts a user interface with asset image in accordance with embodiments of the present disclosure.
Figure 9:
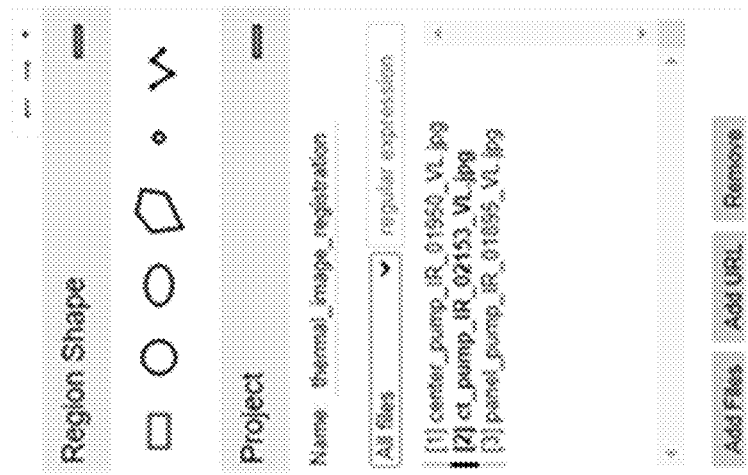
Figure 10:
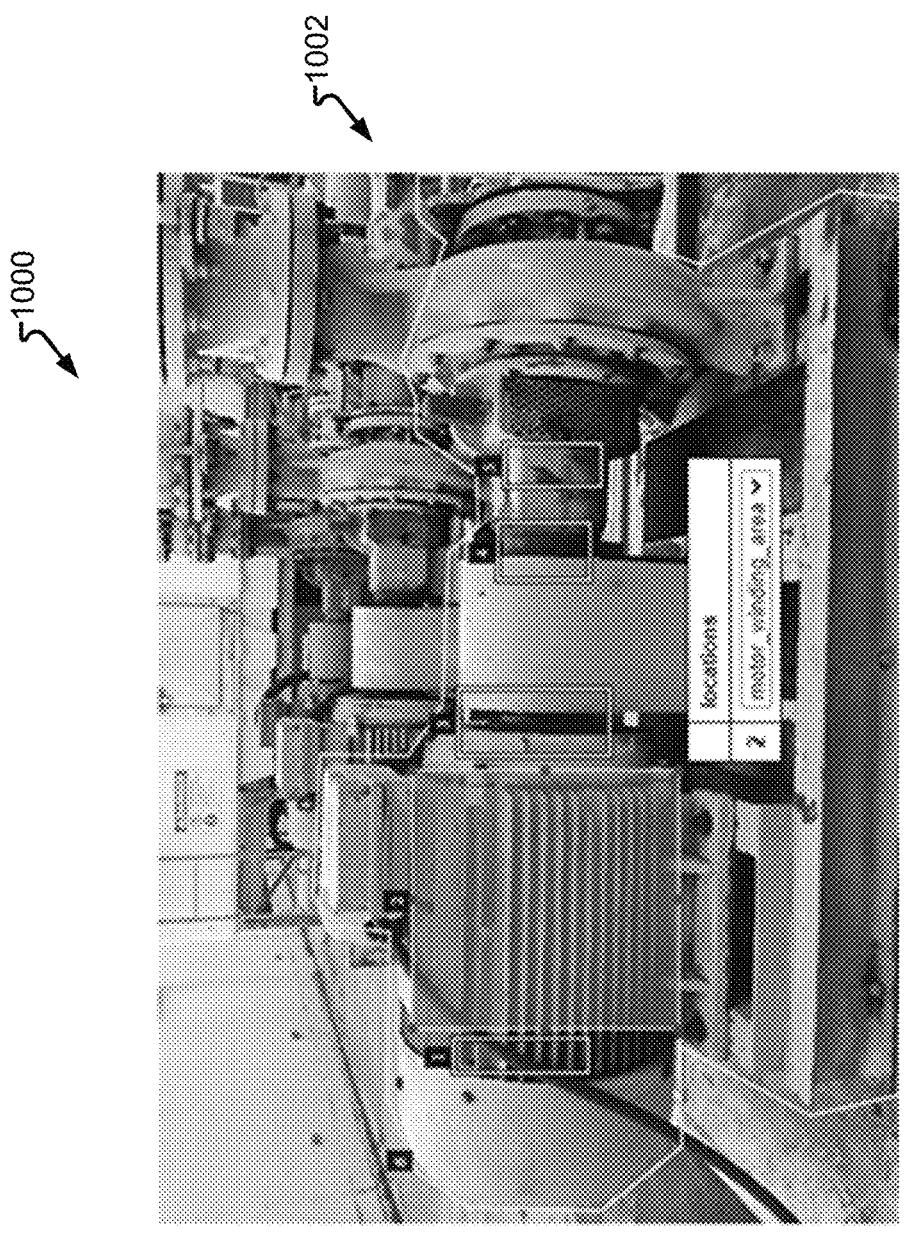
FIG. 10 depicts a user interface with asset image in accordance with embodiments of the present disclosure.
Figure 10:
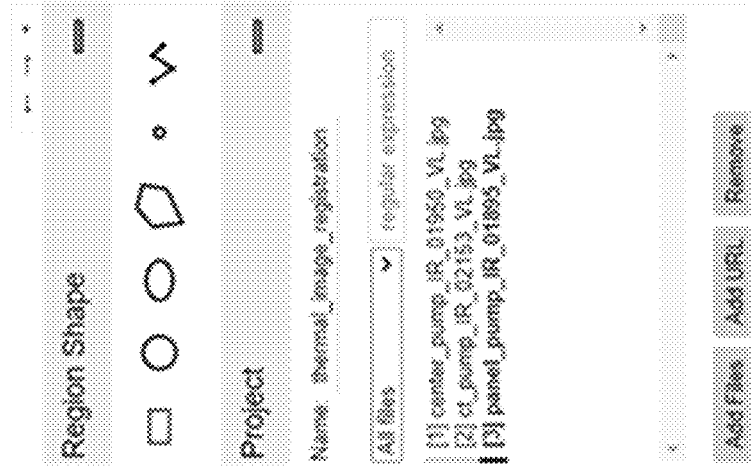

FIG. 8 depicts user interface 800 with asset image 802 in accordance with embodiments of the present disclosure. In one embodiment, multiple pumps can be saved during registration process. FIGS. 9-10 depict the selection of CT pump and panel pump is selected and not the selection of the center pump.

FIG. 9 depicts user interface 900 with asset image 902 in accordance with embodiments of the present disclosure. In one embodiment, asset image 1002 comprises an image of a CT pump.

FIG. 10 depicts user interface 1000 with asset image 1002 in accordance with embodiments of the present disclosure. In one embodiment, asset image 1002 comprises an image of a center pump.

Figure 11:
FIG. 11 depicts user training images in accordance with embodiments of the present disclosure.

FIG. 11 depicts user training images 1100 in accordance with embodiments of the present disclosure. In one embodiment, training images for "Model 1" (such as model 1 (314)), such as for the identification of equipment/pump training images 1100. Training images 1100 comprise asset images of three different pump identifiers (e.g., "center_pump", "ct_pump" and "panel_pump"). A computer vision deep learning model is trained on images taken on multiple pump identifiers and the accuracy is assessed with testing images. For each pump, the user takes a variety of images from different angles and vantage points, based on where a person normally stands before taking a thermal image of the specific pump. Computer vision algorithms can also be used to randomly crop, rotate, change brightness, and transform the original photos in multiple ways, increasing the accuracy of Model 1.

Training images 1100 comprise a series of images used for teaching the machine learning model to identify the ID of "center_pump". When a testing image from the camera is received by Model 1, to predict the pump ID based on the historical images the machine learning model was trained on.

Figure 12:
FIG. 12 depicts user training images in accordance with embodiments of the present disclosure.

FIG. 12 depicts user training images 1200 in accordance with embodiments of the present disclosure. In one embodiment, training images 1200 are provided to train Model 1 to identify "ct_pump."

In one embodiment, FIGS. 13-16 illustrate one example.

Figure 13:
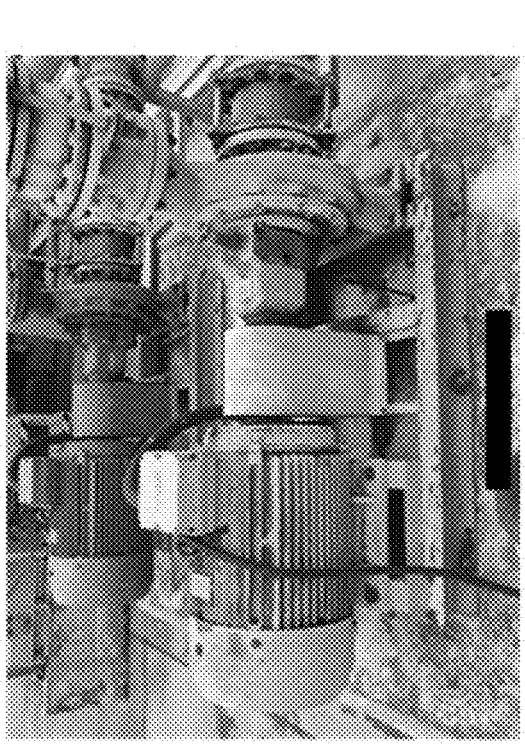
FIG. 13 depicts an asset image in accordance with embodiments of the present disclosure.

FIG. 13 depicts asset image 1300 in accordance with embodiments of the present disclosure. In one embodiment, illustrates asset image 1300, such as an of an asset when captured an asset image is captured in the visible spectrum. Asset image 1300 may appear similar, or even be identical, when captured manually versus automatically but may differ due to minor image processing.

Figure 14:
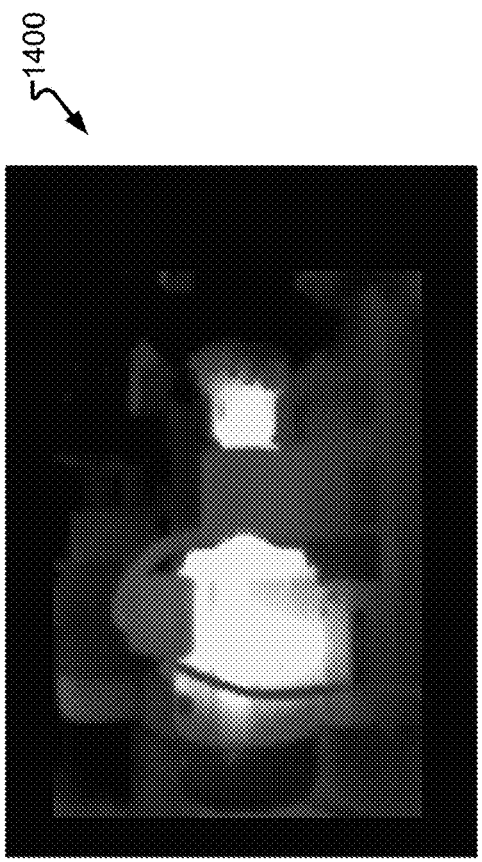
FIG. 14 depicts an asset image in accordance with embodiments of the present disclosure.

FIG. 14 depicts asset image 1400 in accordance with embodiments of the present disclosure. In one embodiment, illustrates asset image 1400, such as an of an asset when captured an asset image is captured in the infrared spectrum. Asset image 1400 may appear similar, or even be identical, when captured manually versus automatically but may differ due to minor image processing.

Figure 15:
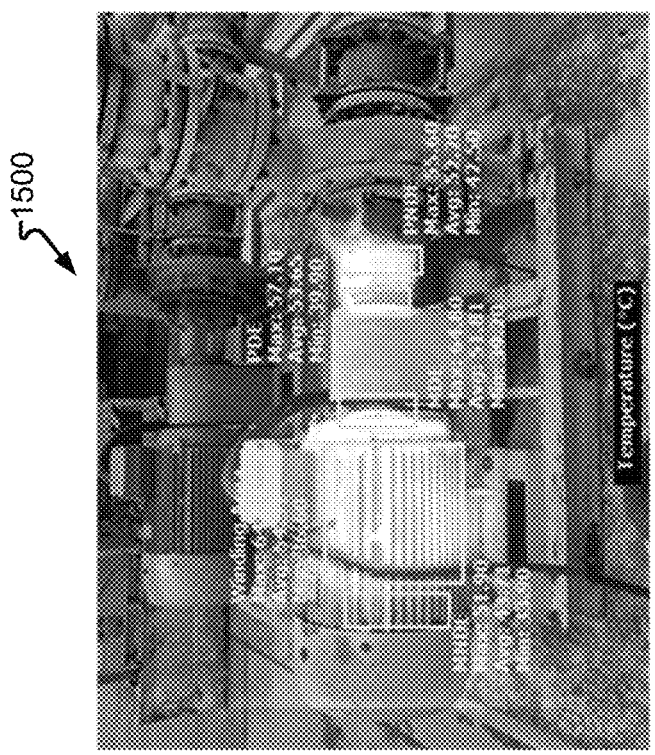
FIG. 15 depicts an asset image in accordance with embodiments of the present disclosure.

FIG. 15 depicts asset image 1500 in accordance with embodiments of the present disclosure. In one embodiment, illustrates asset image 1500, such as an of an asset when a visible and infrared image (e.g., asset image 1300 and asset image 1400) are combined.

A domain expert may then will look at the composite of the visible light image and infrared red image (Row 3 Column 1), which is created by blending the images (e.g., asset image 1300 and asset image 1400), and used identify the pump type or ID. Based on the understanding of the pump, regions of interest (rectangles or polygons) will be selected on the image. In this case, there are 5 regions of interest, called MNDE, Winding Area, MDE, PDE and PNDE. User selects the boxes and the minimum, average and maximum temperature are calculated.

Figure 16:
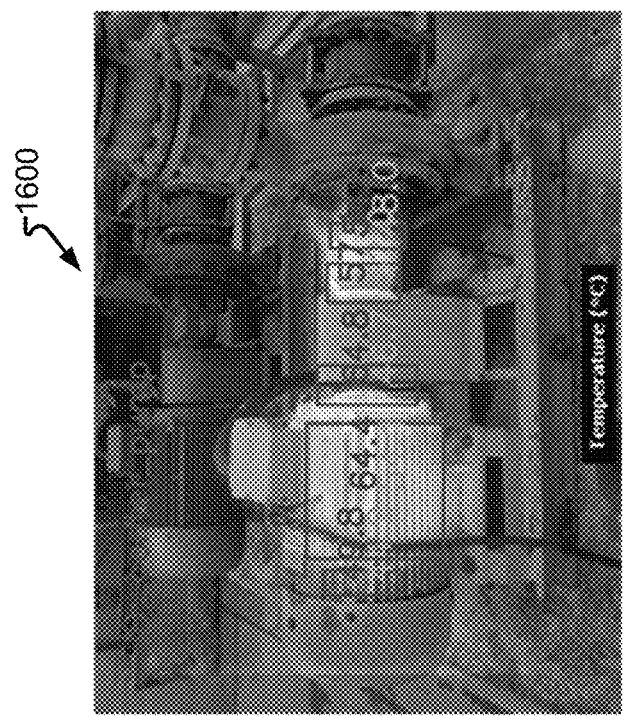
FIG. 16 depicts an asset image in accordance with embodiments of the present disclosure.

FIG. 16 depicts asset image 1600 in accordance with embodiments of the present disclosure. In one embodiment, illustrates asset image 1600, such as an of an asset when a visible and infrared image (e.g., asset image 1300 and asset image 1400) are combined.

In one embodiment, the identifier ("ID") of the asset (e.g., "center_pump") is identified using Model 1. Configuration data is retrieved from the database based on pump ID. The configuration saved five regions of interest (5 red rectangles). Using the thermal data under each region of interest, the maximum temperature (in red) and mean temperature (in green) are calculated. Other measurements, such as minimum temperature, median temperature, or temperature distribution for each region can also be obtained.

In one embodiment, FIGS. 17-22 illustrate another example.

Figure 17:
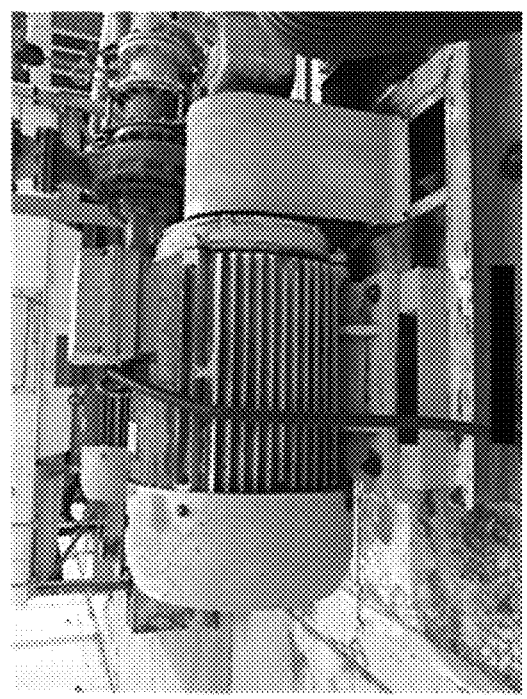
FIG. 17 depicts an asset image in accordance with embodiments of the present disclosure.
Figure 19:
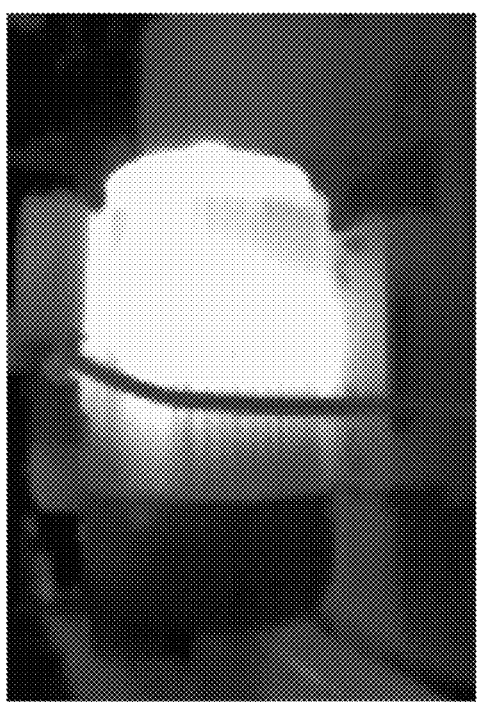
FIG. 19 depicts an asset image in accordance with embodiments of the present disclosure.
Figure 21:
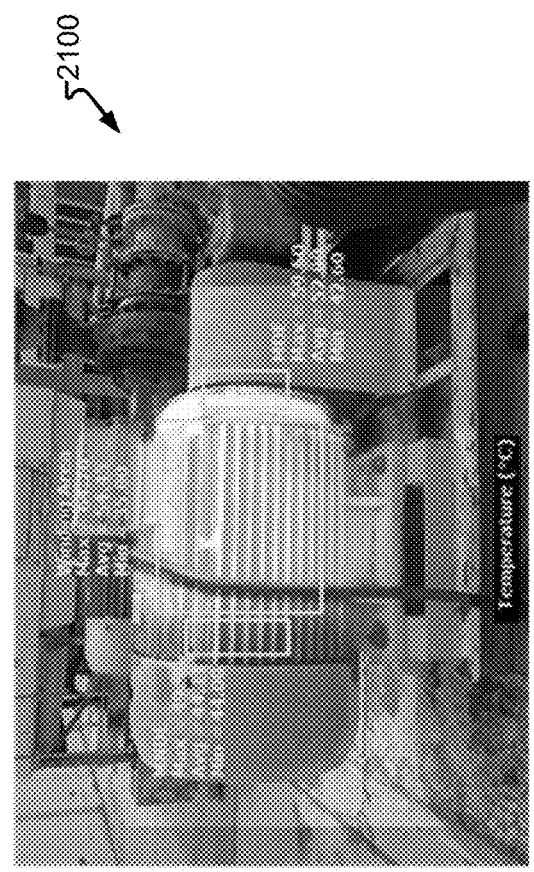
FIG. 21 depicts an asset image in accordance with embodiments of the present disclosure.

Testing image only covers images illustrated in FIGS. 17, 19, and 21 (motor region)

Figure 18:
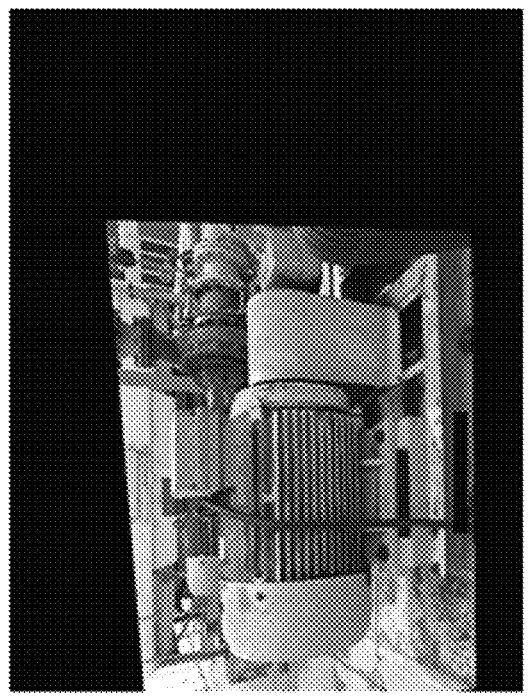
FIG. 18 depicts an asset image in accordance with embodiments of the present disclosure.
Figure 20:
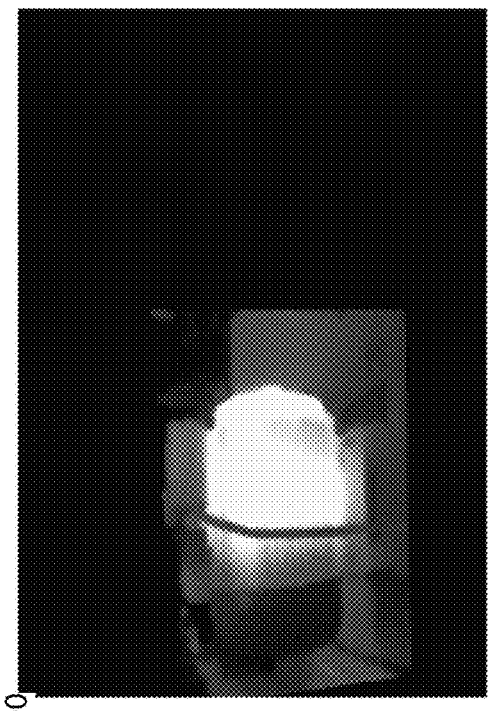
FIG. 20 depicts an asset image in accordance with embodiments of the present disclosure.
Figure 22:
FIG. 22 depicts an asset image in accordance with embodiments of the present disclosure.

FIGS. 18, 20, and 22 illustrate asset images 1700, 1900, and 2100, respectively, which have been transformed in accordance with embodiments of the present disclosure. The pump was registered with the whole pump in view, but user only took photo (captured asset image 1700 of FIG. 17) of the left side (motor side) of pump, with MNDE, Winding Area and MDE regions present. Invention first identifies pump type as "center_pump" using Model 1. Next, Model 2 identifies the important keypoints. Using the keypoints of testing image and template image, the visible light image of test image is transformed, obtaining a mathematical transformation. This transformation is applied to the infrared red image in the same manner. Finally, the regions of interest (in red) are retrieved from database to calculate the required temperatures (see FIG. 22).

FIGS. 17, 19, and 21 comprise asset images 1700, 1900, and 2100, respectively, which are not transformed in accordance with embodiments of the present disclosure. A domain expert first looks at the image, identifies it as "center_pump", and looks at a composite image where the visible light and infrared red image are blended. Next, the expert draws regions of interest (yellow boxes) for each region (see FIG. 21). Notice how the boxes are now of different sizes and locations compared to the previous image. This requires the domain expert to understand the image and equipment. On the other hand, FIG. 22 omits the need for a domain expert after image registration and can use the same regions of interest (red boxes) (see FIG. 22) for the same pump ID-"center_pump", to calculate the required temperature. This allows the temperature calculation to be fully automated.

In one embodiment, FIGS. 23-28, illustrate another example. With respect to FIGS. 23-28, the pump was registered with the whole pump in view, but the user only took photo of the right side (pump side) of pump (see FIG. 23), with winding area, MDE, PDE and PNDE regions present. In one embodiment, the pump type is identified as "center_pump" using Model 1, and conducts similar steps to successfully transform the images, and calculate the required temperatures.

Figure 23:
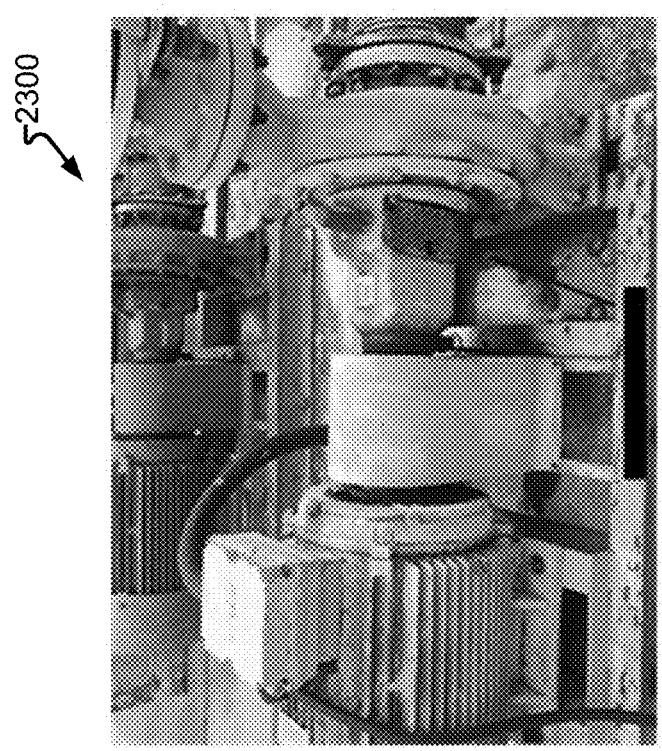
FIG. 23 depicts an asset image in accordance with embodiments of the present disclosure.

FIG. 23 depicts asset image 2300 in accordance with embodiments of the present disclosure. In one embodiment, asset images 2300 illustrates an asset image captured in the visible spectrum.

Figure 24:
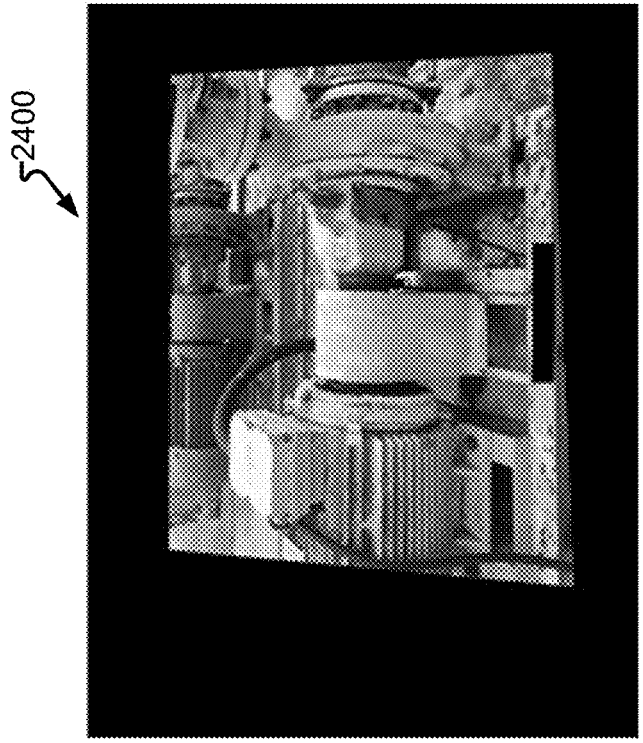
FIG. 24 depicts an asset image in accordance with embodiments of the present disclosure.

FIG. 24 depicts asset image 2400 in accordance with embodiments of the present disclosure. In one embodiment, asset images 2400 illustrates an asset image captured in the visible spectrum.

Figure 25:
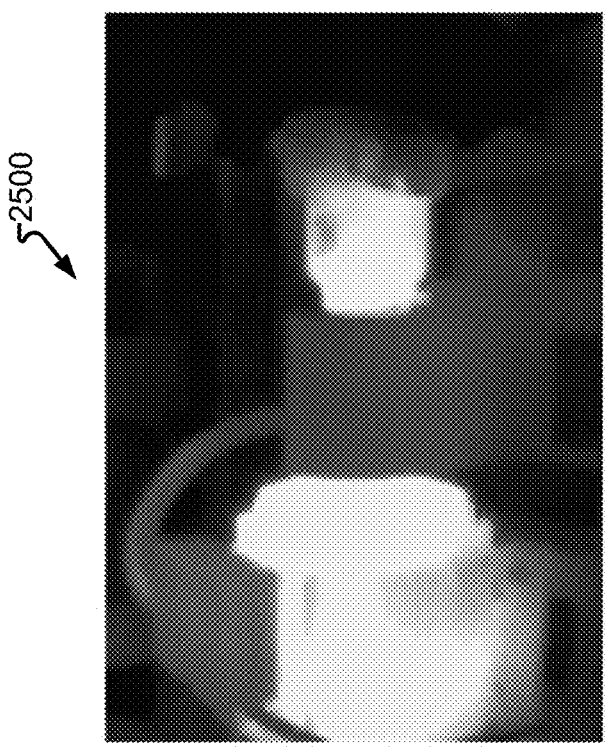
FIG. 25 depicts an asset image in accordance with embodiments of the present disclosure.

FIG. 25 depicts asset image 2500 in accordance with embodiments of the present disclosure. In one embodiment, asset images 2500 illustrates an asset image captured in the infrared spectrum.

Figure 26:
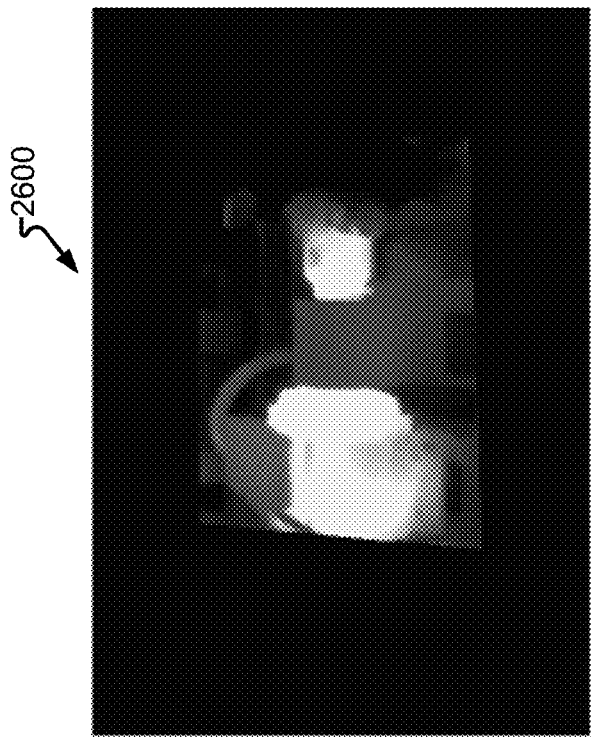
FIG. 26 depicts an asset image in accordance with embodiments of the present disclosure.

FIG. 26 depicts asset image 2600 in accordance with embodiments of the present disclosure. In one embodiment, asset images 2600 illustrates an asset image captured in the infrared spectrum.

Figure 27:
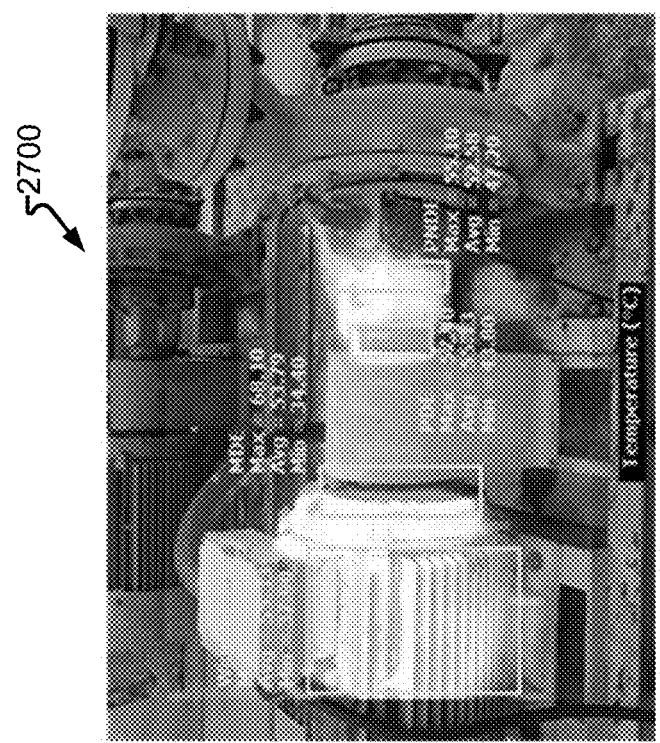
FIG. 27 depicts an asset image in accordance with embodiments of the present disclosure.

FIG. 27 depicts asset image 2700 in accordance with embodiments of the present disclosure. In one embodiment, asset images 2700 illustrates a combined image (e.g., combining asset images 2300 and asset images 2500) with regions provided by a domain expert.

Figure 28:
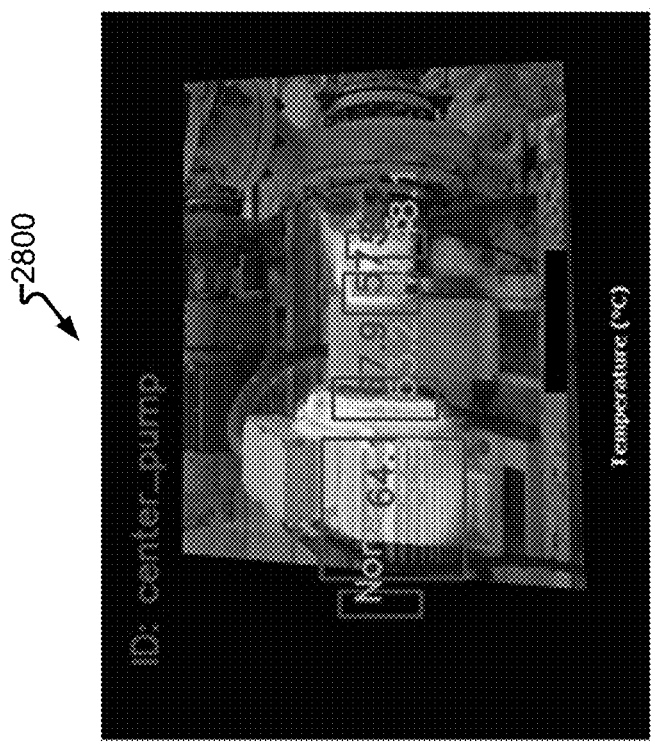
FIG. 28 depicts an asset image in accordance with embodiments of the present disclosure.

FIG. 28 depicts asset image 2800 in accordance with embodiments of the present disclosure. In one embodiment, asset images 2800 illustrates a combined image (e.g., combining asset images 2400 and asset images 2600) with regions provided by Model 1.

Figure 29:
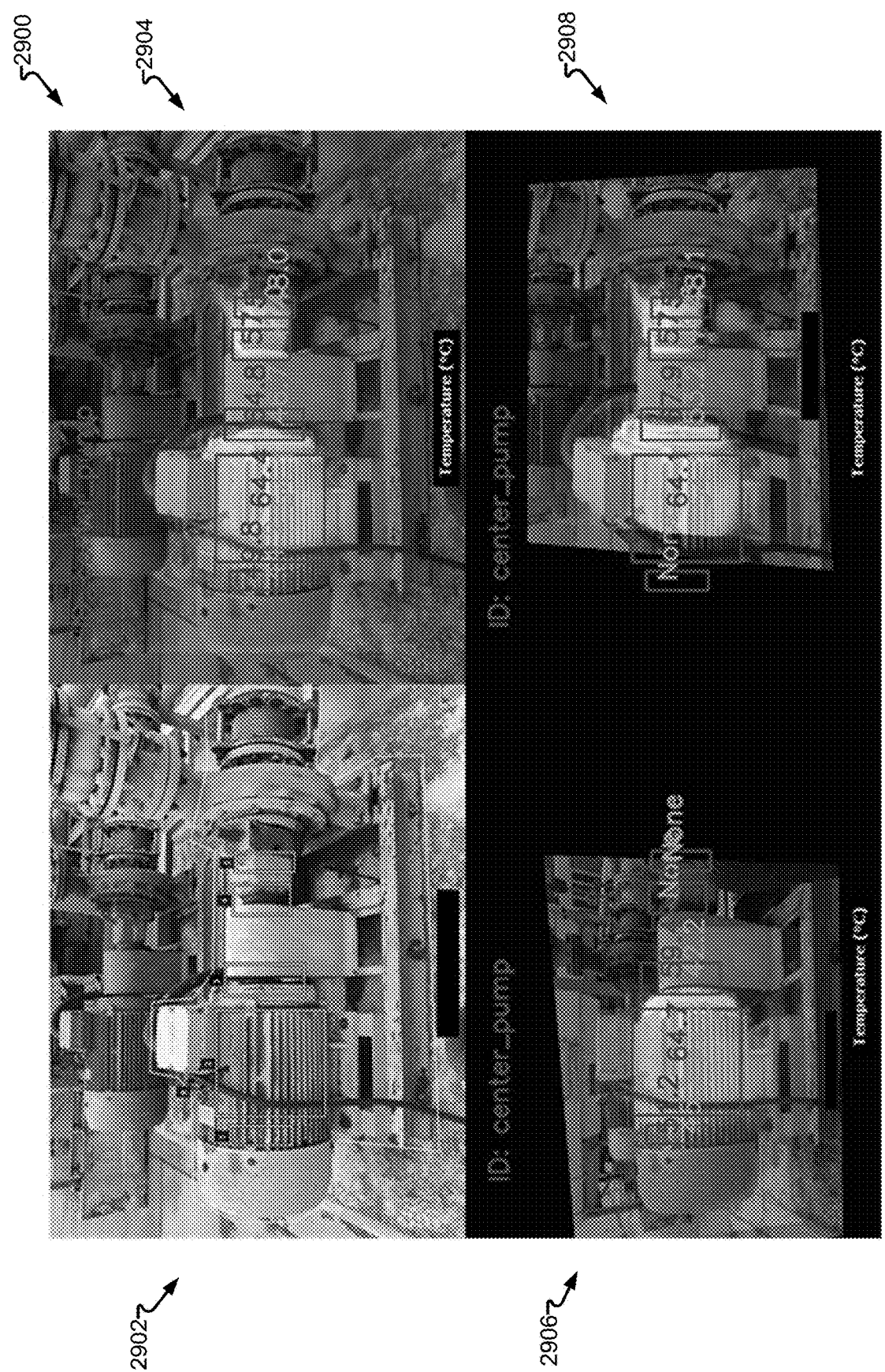
FIG. 29 depicts a collage comprising asset images in accordance with embodiments of the present disclosure.

FIG. 29 depicts collage 2900 comprising asset images 2902, asset images 2904, asset images 2906, and asset images 2908 in accordance with embodiments of the present disclosure. Collage 2900 illustrates asset image 2902 illustrating image registration template, asset image 2904 illustrating test image that is same as registration image, and two test images (asset image 2906 and asset image 2908) different from registration image. Notice how the visible light and infrared red images are transformed automatically before obtaining the temperature in each region of interest, and each region of interest (red box) occupies the same coordinates (x, y) as the original template image. Apart from one time image registration which requires a domain expert to label (asset image 2902), subsequent test images processing are fully automated and can handle differences in photo taking and image perspective.

FIG. 30 depicts collage 3000 comprising asset images 3002 and asset images 3004 in accordance with embodiments of the present disclosure. In Model 2 (e.g., Model 2 (318)), a set of keypoints or distinct features are generated from the testing image. This could use a computer vision deep learning model, or it could use traditional computer vision techniques. These points are shown in blue asset image 3002. From the template image, the existing set of keypoints are extracted, shown in green. Each test image keypoint (in blue) is identified with the template image keypoint (in green). Other potential keypoints in yellow and red are detected, but they are filtered out based on some heuristics, such as low probability of matching.

Using the aggregate coordinate (x, y) shift for each blue-green keypoint pairing, a mathematical matrix called the homography matrix is calculated that maps the template image coordinates to the testing image coordinates. The inverse matrix is calculated that maps back the testing image coordinates to template image coordinates. This matrix transformation is applied on the visible light image, resulting in each blue keypoint moving very close or exactly at the green point it was paired with. Asset image 3004 illustrates the transformed image with the original keypoints (in green) of the template image. We notice the green keypoints match very closely to the silhouette of the pump, indicating a successful transformation. Looking at the top image, it is observed that the user seems to have taken the test image accidentally in a slanted manner with the right side (pump region) tilting upwards, and the final image is adjusted to be level. Using the information obtained from the visible light image, namely the matrix transformation, the same transformation is applied on the infrared red image to shift the image before calculating the temperatures in each region of interest.

FIG. 31 depicts collage 3100 comprising asset images 3102 and asset images 3104 in accordance with embodiments of the present disclosure. Asset image 3102 was captured by a user taking the image too far away as compared to the template image. The red points are keypoints of the test image identified by Model 2 while the green points are keypoints of the template image. A pairing between each red and green keypoint is found, where possible. Although not all keypoints are paired successfully, the final transformation can still be calculated successfully. The result is that the transformed image (asset image 3104) now looks zoomed in, and that the template keypoints in green match closely the shape and silhouette of the pump. This illustrates that the invention can handle different kinds of image perspective before calculating the required temperature values of each region of interest.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited, but utilize a finite set of instructions known to the microprocessor. The machine-readable instructions may be encoded in the microprocessor as signals or values in signal-producing components by, in one or more embodiments, voltages in memory circuits, configuration of switching circuits, and/or by selective use of particular logic gate circuits. Additionally or alternatively, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessors may be integrated into a single processing appliance (e.g., computer, server, blade, etc.) or located entirely, or in part, in a discrete component and connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, a first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein as provided by one or more processing components.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A device for monitoring temperature of an asset in an environment, the device comprising:
   a transport instrument that is instructed to patrol an environment, wherein the transport instrument moves within the environment in an autonomous or semi-autonomous manner;
   a thermal image capture device positioned on the transport instrument that supports autonomous capture of a thermal image of the environment; and
   a processor configured to process the thermal image so as to identify the asset from a database of assets and to determine at least one region of interests of the asset where temperature measurement is to be performed;
   wherein the transport instrument is configured to move in accordance with a result from the processing of the thermal image.

2. The device of claim 1, wherein the transport instrument is configured to move autonomously in one or more of a manner such that image capture is performed at an angle suitable for successful processing of the thermal image, to adjust a distance between the asset and the thermal image capture device for successful processing of the thermal image, or to adjust the position of the thermal image capture device for successful processing of the thermal image in accordance with machine learning.

3. The device of claim 1, wherein the transport instrument is configured to move in accordance with the result from the processing of the thermal image comprises moving an internal portion of the transport instrument that is configured to hold the thermal image capture device while remaining stationary in position.

4. The device of claim 1, wherein the thermal image comprises an integrated image from a visual image capture device and a thermal image capture device.

5. A method for monitoring a temperature of an asset located within an environment, the method comprising:
   receiving a thermal image of the environment that includes an asset by using a thermal image capture device positioned on a transport instrument that is instructed to patrol the environment, wherein the transport instrument moves within the environment in an autonomous or semi-autonomous manner;
   identifying the asset from a database of assets;
   determining at least one region of interests of the asset where temperature measurement is to be performed;
   adjusting movement of the transport instrument for successful processing of the thermal image; and
   calculating at least one temperature value of the asset.

6. The method of claim 5, further comprising:
   providing the thermal image to a machine learning model; and
   receiving an output from the machine learning model in response to the machine learning model that is related to a processed result of the thermal image based at least in part on a detection model, wherein the output comprises one or more regions of interests of the asset.

7. The method of claim 6, wherein the detection model comprises a regions of interest (ROI) detection model trained based at least in part on a set of base thermal images associated with a type of the asset that is prepared prior to capturing the thermal image.

8. The method of claim 6, wherein each of the one or more regions of interest are prepared from one or more predetermined image positions within the thermal image.

9. The method of claim 5, wherein the temperature comprises at least one of: a maximum temperature value, a minimum temperature value, a mean temperature value, a median temperature value, or other statistical measures associated with temperature.

10. The method of claim 6, wherein:
    the thermal image comprises at least one object located within the environment that is used for identification purpose of the asset or the identification of the location of the asset; and
    the processed result is obtained through mapping the at least one object included in a portion of the thermal image with a reference image based at least in part on the machine learning model.

11. The method of claim 10, wherein the reference image is obtained based at least in part on the machine learning network, wherein the machine learning model is trained based on a set of images associated with the asset, and wherein the set of images are transformed via at least one of cropping, blurring, rotating, or brightness adjustment.

12. The method of claim 10, wherein the reference image comprises the one or more regions of interest, wherein each of the one or more regions of interest correspond to a predetermined part of the asset.

13. The method of claim 10, wherein the mapping the at least one object comprises at least one of mapping an image coordinate of the thermal image to an image coordinate of the reference image based at least in part on the machine learning model or remapping process where the image coordinate of the thermal image is updated to a different set of coordinates, resulting in a different region of the thermal image being mapped.

14. The method of claim 5, wherein the transport instrument is configured to adjust at least one of an angle of image capture in accordance with a result of the processed thermal image, a distance of image capture in accordance with a result of the processed thermal image; or a location of image capture in accordance with a result of the processed thermal image.

15. The method of claim 5, wherein the identifying the asset from the database of assets comprises processing a color image and determining the at least one region of interests of the asset comprises processing the color image.

16. The method of claim 5, wherein:
    the thermal image comprises an integrated image from a visual image capture device and a thermal image capture device;
    the identifying the asset from the database of assets comprises processing the thermal image; and
    determining the at least one region of interests of the asset comprises processing the thermal image.

17. The method of claim 5, wherein the identifying the asset from the database of assets comprises mapping the thermal image to an image template that is generated based on a machine learning model.

18. The method of claim 5, wherein the calculating at least one temperature value of the asset comprises processing an ambient temperature of the environment where the asset is located.

19. The method of claim 5, wherein the calculating at least one temperature value of the asset comprises determining the operating state of the asset, wherein the operation state comprises standby state, transient state and steady state.

20. A computer-implemented method of training a neural network for asset detection comprising:
   collecting a set of digital asset images from a database;
   applying one or more transformations to each digital asset image, including mirroring, rotating, smoothing, sharpening, blurring, increasing contrast, increasing saturation, increasing brightness, decreasing contrast, decreasing saturation, decreasing brightness, cropping, zooming in, or zooming out to create a modified set of digital asset images;
   creating a first training set comprising the collected set of digital asset images, the modified set of digital asset images, and a set of digital non-asset images;
   training the neural network in a first stage using the first training set;
   creating a second training set for a second stage of training comprising the first training set and digital non-asset images that are incorrectly detected as asset images after the first stage of training; and
   training the neural network in the second stage using the second training set.

* * * * *